(12) United States Patent
Kozlov et al.

(10) Patent No.: US 12,184,760 B2
(45) Date of Patent: Dec. 31, 2024

(54) SYSTEM AND METHOD OF GRANTING A USER DATA PROCESSOR ACCESS TO A CONTAINER OF USER DATA

(71) Applicant: AO Kaspersky Lab, Moscow (RU)

(72) Inventors: Sergey V. Kozlov, Moscow (RU);
Andrey A. Efremov, Moscow (RU);
Dmitry V. Shmoylov, Moscow (RU);
Pavel V. Filonov, Moscow (RU);
Dmitry G. Ivanov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 362 days.

(21) Appl. No.: 17/335,144

(22) Filed: Jun. 1, 2021

(65) Prior Publication Data

US 2022/0094531 A1 Mar. 24, 2022

(30) Foreign Application Priority Data

Sep. 24, 2020 (RU) ................................ 2020131457

(51) Int. Cl.
*H04L 9/08* (2006.01)
*H04L 9/14* (2006.01)
*H04L 9/40* (2022.01)

(52) U.S. Cl.
CPC .......... *H04L 9/0825* (2013.01); *H04L 9/0894* (2013.01); *H04L 9/14* (2013.01); *H04L 63/0407* (2013.01); *H04L 63/102* (2013.01)

(58) Field of Classification Search
CPC .. G06F 21/62; G06F 21/6218; G06F 21/6209; G06F 21/60; G06F 21/604; G06F 21/6227; H04L 63/04; H04L 63/0428; H04L 63/0407; H04L 63/0442; H04L 63/0478; H04L 9/08; H04L 9/0825; H04L 9/0894; H04L 9/14; H04L 9/088
See application file for complete search history.

(56) References Cited

U.S. PATENT DOCUMENTS 8,850,528 B2 * 9/2014 Van Biljon ............ G06Q 40/00
709/224
9,124,637 B2 9/2015 Brouwer et al.
(Continued)

FOREIGN PATENT DOCUMENTS

EP 3248360 A1 11/2017

*Primary Examiner* — Shaqueal D Wade-Wright
(74) *Attorney, Agent, or Firm* — ArentFox Schiff LLP; Michael Fainberg

(57) ABSTRACT

Disclosed herein are systems and methods for granting a user data processor access to a cryptocontainer of user data. In one aspect, an exemplary method comprises, creating a cryptocontainer for user's data, wherein the cryptocontainer receives at least one element of the user's data and encrypts the element; for the user data processor, establishing rights for accessing the element using a first key, and forming at least one access structure, the forming including, placing the first key in the access structure based on the established rights, receiving, from the user data processor, a second key linked to the user data processor which is to be used for accessing the first key, and encrypting the first key with the second key; and when a request for access to the cryptocontainer is received, granting, to the user data processor, access to the cryptocontainer based on the formed at least one access structure.

19 Claims, 14 Drawing Sheets

(56) References Cited

U.S. PATENT DOCUMENTS

| | | | |
|---|---|---|---|
| 9,419,951 B1 | 8/2016 | Felsher et al. | |
| 9,838,830 B2 | 12/2017 | Lyons | |
| 2007/0074270 A1* | 3/2007 | Meehan | H04L 9/3263 |
| | | | 726/2 |
| 2012/0036370 A1 | 2/2012 | Lim et al. | |
| 2013/0208893 A1* | 8/2013 | Shablygin | H04L 9/0894 |
| | | | 380/277 |
| 2014/0108798 A1* | 4/2014 | Shirai | H04L 63/08 |
| | | | 713/167 |
| 2014/0189363 A1 | 7/2014 | Thomas et al. | |
| 2016/0134932 A1 | 5/2016 | Karp et al. | |
| 2018/0013562 A1* | 1/2018 | Haider | G06F 16/951 |
| 2019/0238319 A1 | 8/2019 | Beck | |

* cited by examiner

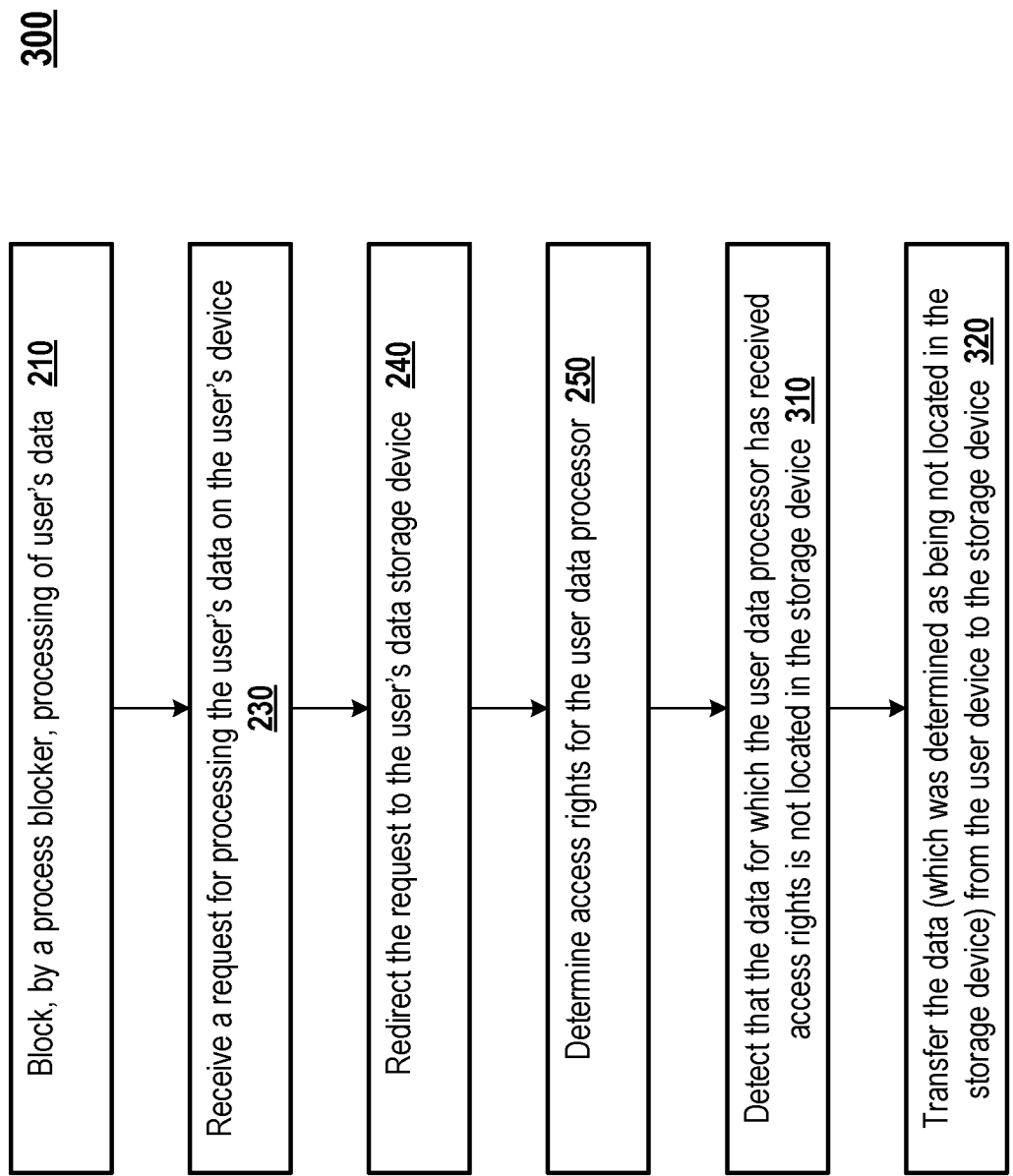

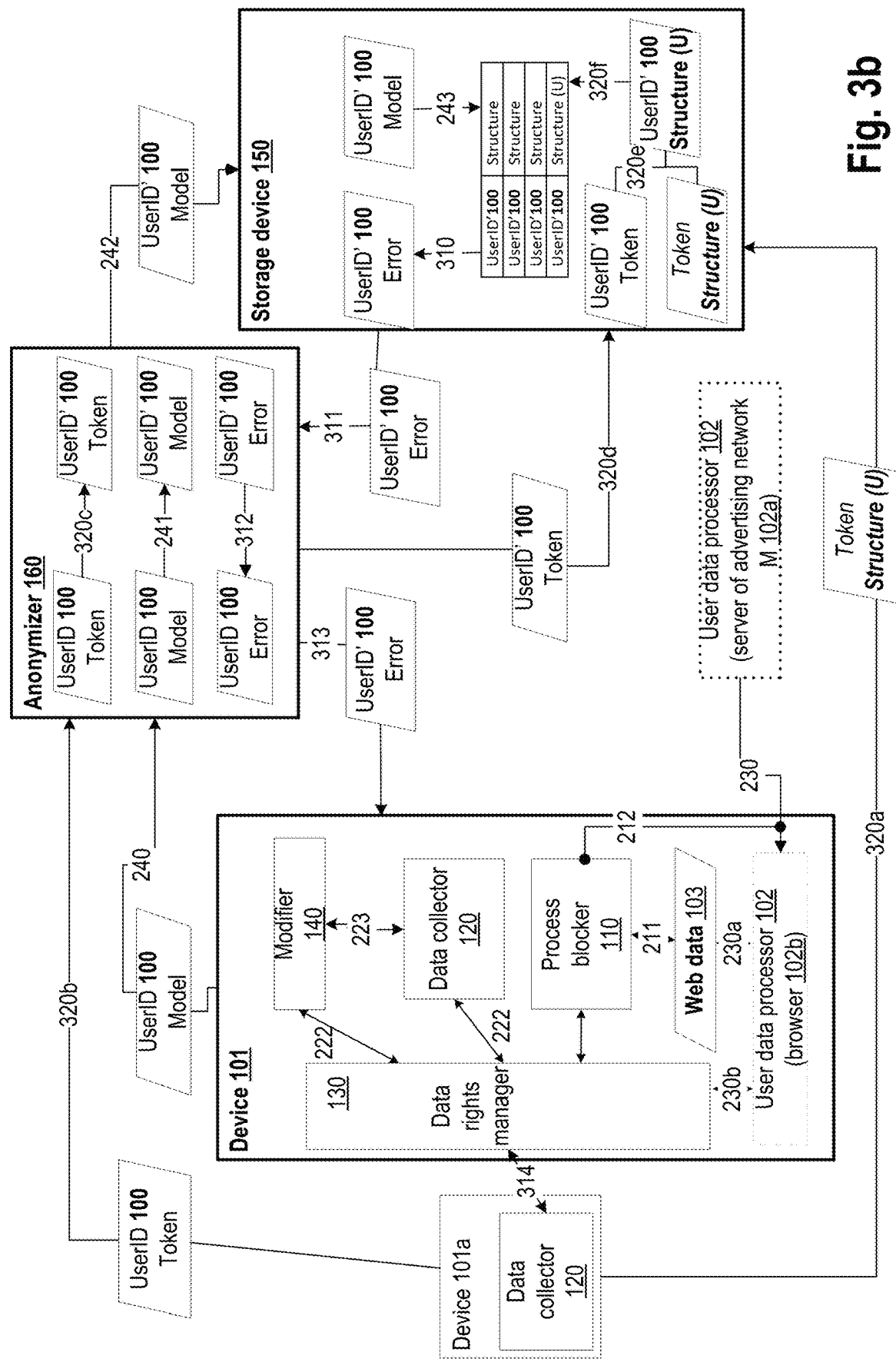

SYSTEM AND METHOD OF GRANTING A USER DATA PROCESSOR ACCESS TO A CONTAINER OF USER DATA

CROSS REFERENCE TO RELATED APPLICATIONS

The present application claims priority to Russian Patent Application No. 202013457, filed on Sep. 24, 2020, the entire content of which is incorporated herein by reference.

FIELD OF TECHNOLOGY

The present disclosure relates to the field of data security, and specifically, to systems and method for protecting the confidentiality of user data and ensuring privacy while granting access to a container of user data.

BACKGROUND

The volume of data collected from users' devices is increasing year by year. There is also a growth in the variety and number of the devices from which data are collected. The devices now include "Internet of Things" (IoTs) as well as personal computers, notebooks, and smartphones. Data are commonly collected from devices without any clear consent by the user; but even if such consent is given, the user does not always understand all the consequences of his/her decision. Data collected from devices is subsequently distributed around the network in an uncontrolled way, and may cause harm to the user. For example, a user may become a victim of criminals who have obtained his/her telephone number or credit card. Moreover, it is not only malicious parties that cause problems; unscrupulous employers may use data from users' devices to track their employees. Another result of uncontrolled data collection is the user of the device may receive annoying advertisements for merchandize that are targeted to the user based on categories of the merchandize.

There are some mechanisms by device manufacturers that attempt to defend the user from concealed data collection and to regulate data operations. One example is Google's Firebase system, which synchronizes data between different applications on Android devices and grants access to these data to a third party. In Apple, there is a similar platform, called the Apple Security Framework, used to protect information, to establish a trusted connection, and to control access to software on a device. The platform is used to establish a user's identity, to ensure the security of data both in a store and in transfer over the network, and to confirm the validity of a code. These mechanisms allow data from devices to be shared with third parties. However, these mechanisms are not transparent to the user, are irreversible, and only provide weak protection against tracking by third-party applications.

Therefore, there is a need for a method and a system for collecting data from users' devices while providing an effective way of protection the collected data from being improperly disseminated and misused.

SUMMARY

Aspects of the disclosure relate to data security, more specifically, to systems and methods of granting a user data processor access to a container of user data collected from a user's devices. For example, the user data may be first stored in a cryptocontainer for being accessed by processors, e.g., by processors of storage devices.

In one exemplary aspect, a method is provided for granting a user data processor access to a cryptocontainer of user data, the method comprising: creating a cryptocontainer for user's data, wherein the cryptocontainer receives at least one element of the user's data and encrypts the at least one element; establishing, for the user data processor, rights for accessing the at least one element of the user's data using a first key; forming, for the user data processor, at least one access structure, wherein the forming of the at least one access structure includes: placing the first key in the at least one access structure based on the established rights, receiving, from the user data processor, a second key linked to the user data processor which is to be used for accessing the first key, and encrypting the first key with the second key; and when a request for access to the cryptocontainer is received, granting, to the user data processor, access to the cryptocontainer based on the formed at least one access structure.

In one aspect, the cryptocontainer encrypts the at least one element using the first key.

In one aspect, the second key is a combination of at least a pair of keys comprising at least one private key and at least one public key.

In one aspect, the at least one public key is received for encrypting the first key.

In one aspect, information about the second key is transferred to the user data processor.

In one aspect, the at least one public key is received from the user data processor to which access is granted.

In one aspect, each element of the at least one element of the user's data is encrypting using a respective separate first key.

In one aspect, the rights for accessing the at least one element are established based on a set of actions that the user data processor is permitted to perform on the at least one element of the user data.

In one aspect, the set of actions includes at least one of: reading data, and writing data.

In one aspect, a separate first key is created for each action of the set of actions.

In one aspect, the created first key comprises a combination of at least a pair of keys, the pair of keys including at least one private first key and at least one public first key.

In one aspect, the pair of keys is formed from the private first key and the public first key such that the private first key is used for encrypting data when writing takes place and the public first key is used for decrypting the data when reading takes place.

In one aspect, the first public key is placed in the at least one access structure when rights for reading data from a field are established.

In one aspect, the first private key is placed in the at least one access structure when rights for writing data into a field are established.

In one aspect, the method further comprises: during the creation of the cryptocontainer for user's data, adding an access structure for a data access rights manager, wherein at least one first key for the added access structure of the data access rights manager is placed in the access structure of the user data processor, and wherein the at least one first key is encrypted.

In one aspect, the placing, in the access structure of the user data processor, the at least one first key for the added access structure of the data access rights manager includes extracting the first key from the access structure of the data access rights manager.

In one aspect, the method further comprises: requesting, on behalf of the user data processor, rights for accessing elements of the user's data in the created cryptocontainer.

According to one aspect of the disclosure, a system is provided for granting a user data processor access to a cryptocontainer of user data, the system comprising a hardware processor configured to: create a cryptocontainer for user's data, wherein the cryptocontainer receives at least one element of the user's data and encrypts the at least one element; establish, for the user data processor, rights for accessing the at least one element of the user's data using a first key; form, for the user data processor, at least one access structure, wherein the forming of the at least one access structure includes: placing the first key in the at least one access structure based on the established rights, receiving, from the user data processor, a second key linked to the user data processor which is to be used for accessing the first key, and encrypting the first key with the second key; and when a request for access to the cryptocontainer is received, grant, to the user data processor, access to the cryptocontainer based on the formed at least one access structure.

In one exemplary aspect, a non-transitory computer-readable medium is provided storing a set of instructions thereon granting a user data processor access to a cryptocontainer of user data, wherein the set of instructions comprises instructions for: creating a cryptocontainer for user's data, wherein the cryptocontainer receives at least one element of the user's data and encrypts the at least one element; establishing, for the user data processor, rights for accessing the at least one element of the user's data using a first key; forming, for the user data processor, at least one access structure, wherein the forming of the at least one access structure includes: placing the first key in the at least one access structure based on the established rights, receiving, from the user data processor, a second key linked to the user data processor which is to be used for accessing the first key, and encrypting the first key with the second key; and when a request for access to the cryptocontainer is received, granting, to the user data processor, access to the cryptocontainer based on the formed at least one access structure.

The method and system of the present disclosure are designed to provide data security, in a more optimal and effective manner of protecting the data while also granting access to a container of user data. The first technical result is an improvement in the level of protection of user data thereby providing security to the user.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 3 illustrates a method for renewing a user's data in a storage device.

FIG. 3b illustrates an aspect of a method for updating a user's data in a transfer of an updated data structure to a storage device.

DETAILED DESCRIPTION

Exemplary aspects are described herein in the context of a system, method, and a computer program granting a user data processor access to a cryptocontainer of user data in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 1:
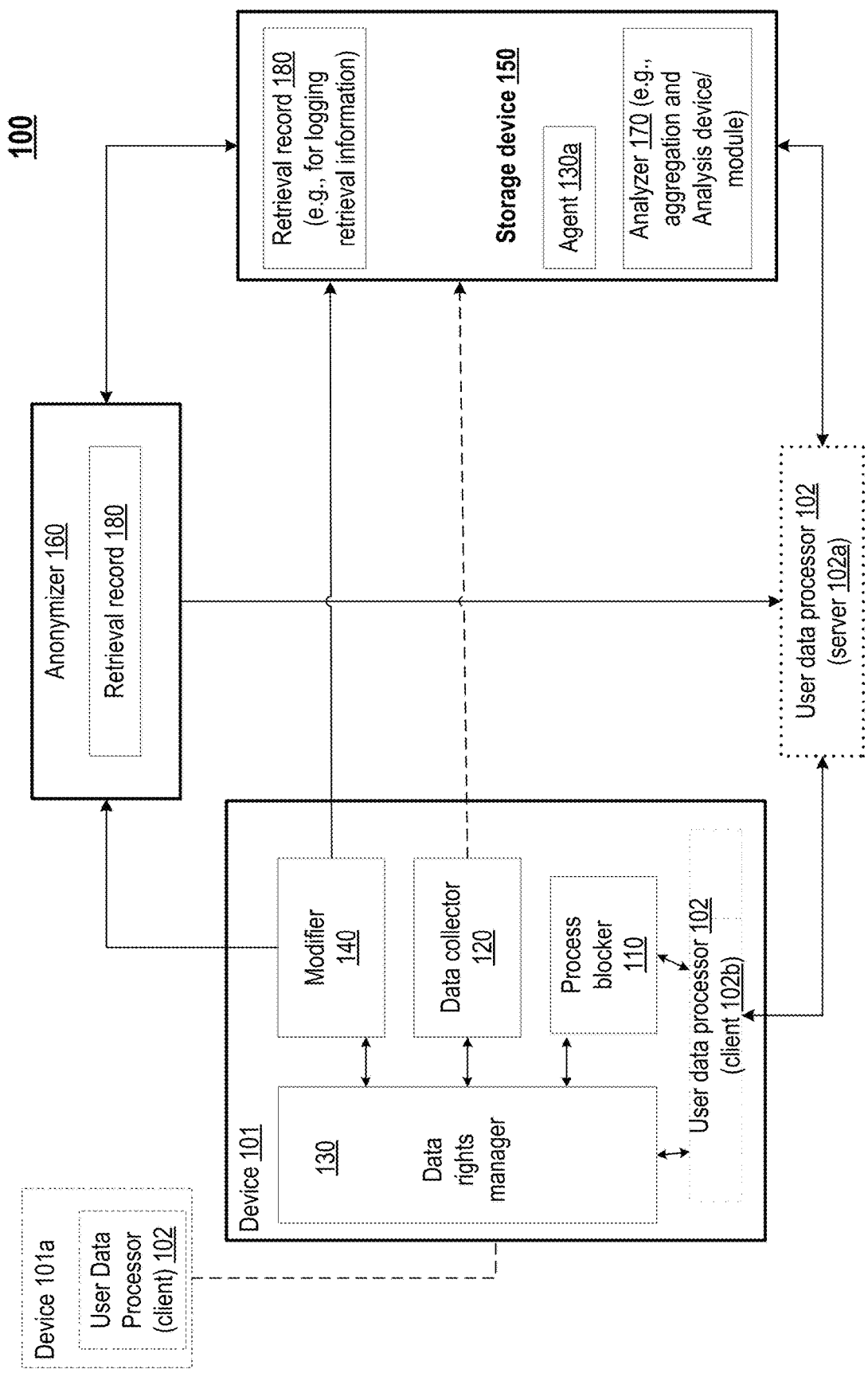
FIG. 1 illustrates a system for exchanging of data from a user's devices.

FIG. 1 illustrates a system 100 for exchanging of data from a user's devices. The system 100 is designed for the transparent and secure processing of the data of users of devices 101. In the context of the present disclosure, "data of a user of devices" refers to data from devices in the user's environment, created on a device by various types of software, and including both data input by the user and data created in the operation of programs and applications, for example a stream of clicks (clickstream), communications in messaging services, location data, and data collected from smart home IoT devices or other IoT devices in the user's ecosystem, such as a private car.

In one aspect, the system 100 consists of:
- a user's device 101, with process blocker 110, data collector 120, data access rights manager 130 (access rights manager 130), and modifier 140;
- user data processor 102;
- storage device 150, with an aggregation and analyzer 170 and a retrieval record 180 (a record log for data retrievals); and
- anonymizer 160, with a retrieval record 180.

The process blocker 110 is designed to block the processing of data (including personal data) on the user's device by the user data processor 102. Blocking can be carried out on any user data processor 102, including third-party devices and those belonging to the platform by which the device is controlled (for example, Apple, Google, Huawei or Xiaomi software and services) on which the process blocker is installed, or which are accessible to the process blocker. For example, the process blocker 110 may be installed on a router through which the user's personal devices 101a and IoT devices communicate with the internet, and the process blocker 110 analyzes the network traffic flowing through the router. In one aspect, the process blocker 110 blocks the collection of only critical data, not the collection of any data. Critical data includes data about which the law or the authorized party imposes restrictions on collection, storage, access, distribution and/or processing. The critical data is usually sensitive to disclosure, distribution, or leakage, since the occurrence of these events results in the infringement of the rights and legally protected interests of parties. Furthermore, the distribution or leakage of such data creates liability for parties who have permitted the infringement of the rules for collection, storage, access, and processing specified for these data.

In one aspect, the critical data is that of confidential data ("sensitive data"). It is noted that in the context of this disclosure, confidential data and confidential information are synonymous. Confidential data are taken to include data stored in accordance with the law of the country whose jurisdiction covers the user of the device that constitutes the client in the system described.

In one aspect, confidential data include personal data (PD) and data containing:
  commercial secrets;
  tax secrets;
  banking secrets;
  medical secrets;
  notarial secrets;
  legal secrets;
  auditing secrets;
  communications secrets;
  insurance secrets;
  testamentary secrets;
  adoption secrets;
  confessional secrets;
  investigation secrets;
  judicial secrets;
  information about protected persons; and
  government secrets.

In another aspect, the processing of a user's data for marketing purposes is blocked. In another aspect, the processing of any of a user's data by the user data processor 102 is blocked, where the data are not concerned with the direct functionality of applications or programs using these user data processor. In another aspect, the blocking includes any processing by user data processor 102 not included on the list of permitted (trusted) devices or data processors. The blocking of data processing may be carried out by various methods, including direct and indirect methods. The direct blocking includes blocking where the actions themselves associated with the data processing are blocked. Indirect refers to the scenario in which the data processing is not directly impeded, but the processing does not achieve its objectives even though it is executed. Direct blocking methods may include the prohibition of access to a user's data by the user data processor. Indirect processing methods include, in particular, the breaking of the associative link between the data to be sent from the user's devices, for example, by removing cookie files or spoofing the user's identifiers set up by tracking networks on a device.

The data access rights manager 130 is designed to manage access to data. The data access rights manager 130 defines the rights of the user data processor 102 to access data, withdraws rights from user data processor, and draws up lists of permitted (trusted) user data processor 102. The data access rights manager 130 stores or establishes the structure format (data model) for the user's data specified for allocation on the storage device 150. The data access rights manager 130 may be configured by external updatable policies or by user policies or directly by the user's input. The data access rights manager 130 also updates the user's data model specified for sending to the storage device 150 (operating scenarios will be described below). Those skilled in relevant art may find examples of user's data model in previous literature on data organization, such as GOST 20886-85: Data organization in data processing systems, Terms and definitions.

The data collector 120 is intended to collect user data specified for transfer to the storage device 150 from the user's devices. The data collector 120 populates the fields of the data structure received from the data access rights manager 130. The data collector 120 then transfers the populated data structure to the modifier 140. In one aspect, the data collector 120 sends the populated data structure to the storage device 150 directly. Usually, the blocking by the process blocker 110 and the collection of data by the data collector 120 take place independently of the data requirements of the user data processor 102. For example, according to the configurations, the process blocker 110 blocks web tracking, and the data collector 120 collects all the data whose processing was blocked in advance (before the attempted processing by the user data processor 102) on the device 101 by the process blocker 110; the collected data are then housed in the storage device 150.

The device 101 comprises a modifier 140 designed to analyze the data in the fields of the structure received from the data collector 120, in order to determine the composition of the data, divide the data structure into substructures, and select the route for sending data to the remote storage device 150 for the resulting substructures. The modifier 140 determines the necessity of dividing the structure into substructures according to the fields of the structure. There may be various criteria for the division of the data structure into substructures, one of these criteria being the presence of personal data ("Personal Identification Information" (PII)) or special categories thereof (according to GDPR terminology, for example), in the presence of which the data structure is divided in such a way that one substructure contains personal data (hereafter PD, or PII) or special categories thereof, while the other substructure contains data that are not personal. The relationship of the data to personal data is determined, for example, by the law of the country whose jurisdiction covers the user of the device that constitutes the client in the system described (in other words, according to the location of the data source). Another, more general, criterion is the presence of critical data. In one aspect, the modifier 140 is intended to convert the data structures on the device before sending the data to the storage device 150.

In one aspect, the methods for converting the data substructures are:
  quantization;
  sorting;
  merging (pasting);
  grouping;
  configuring the data set;
  tabular substitution of values;
  calculated values;
  data encoding;
  encryption;
  convolution; and
  normalization (scaling).

Some kinds of conversion may be used not only for individual data (fields) in a substructure, but also for a substructure as a whole, for example, by tokenization and/or encryption. In one aspect, the conversion takes place without the possibility of reverse conversion by any means other than the modifier 140 and/or the storage device 150. "Conversion" is taken to mean a projection (function) of a quantity on itself or projections that translate a given quantity into another quantity.

A particular case of a user data processor may be a client 102b (for example, an application) that collects the user's data on the device 101 at the request of a server 102a connected to the application in the context of a client-server interaction. "Data processing" is taken to mean any action (operation) or combination of actions (operations) carried out with the use of data automation means (user data processor), including the collection, recording, arrangement, accumulation, storage, adjustment (updating, changing), extraction, use, transfer (distribution, provision, access), depersonalization, blocking, removal and deletion of data.

In one aspect, the modifier 140 selects a network route along which the structure or substructure will be sent to the storage device 150. This route may include an anonymizer 160. The anonymizer 160 is designed to convert the structures and substructures passing through it by both direct and reverse conversion (examples are considered below). The anonymizer 160 is not located in a same local network or intranet (the network of a single organization, for example) to which the device 101 belongs. In one aspect, the anonymizer 160 is not located in a local network or intranet to which the storage device 150 belongs. The retrieval record 180 is connected to the anonymizer 160 and to the storage device 150.

The retrieval record 180 is intended to track operations with the user's data and to record all acts of retrieval (or transfer) of the user's data from the storage device 150. Based on the log which is kept by said retrieval record 180, it is always possible to check whether or not the use of the user's data by third parties is in accordance with the access rights (i.e., whether or not legitimate use). For example, suppose the history of the user's search queries was transferred to the network N without the right of transfer to third parties, as recorded by the retrieval record 180. Suppose, subsequently, the user receives advertising offers from the network M on the basis of his search queries. The determination may be based on advertising offers recorded by additional means of the system 100 (not shown in FIG. 1), and/or based on data from the device and from the retrieval record 180. The system 100 of the present disclosure records the incident. This incident may be processed subsequently, depending on the supplementary add-ons of the system 100. For example, the supplementary means of the system 100 may draw up a complaint to network N, send a demand for removal of data to network M, send information to a regulator, etc.

The storage device 150 is designed for storing user data, i.e., it is the location of user data. The storage device 150 may transfer the user's data to the user data processor 102, while allowing the data to be processed without transfer, directly in the storage device 150. The storage device 150 is connected to analyzer 170 which is designed for automated data aggregation and analysis and for constructing, based on the analysis, various analytical results and aggregates. The various analytical results and aggregates are also placed in the storage device 150 and may be transferred to external user data processor 102 if the latter have rights to this. The analyzer 170 also links the data from various devices 101 of a single user/household. The storage device 150 is also connected to a data access rights manager (through an agent 130a, for example), since the storage device 130 determines the rights of data access, by the user data processor 102, to the user's data. The storage device 150 may be located in the device 101, in the local network of the device 101, or remotely, as shown in FIG. 1.

In one aspect, the storage device receives the user's data, including data from user data processor 102. For example, it receives data from the user data processor 102 of social networks, online and offline retail stores, advertising networks, data exchanges, and others.

Figure 11:
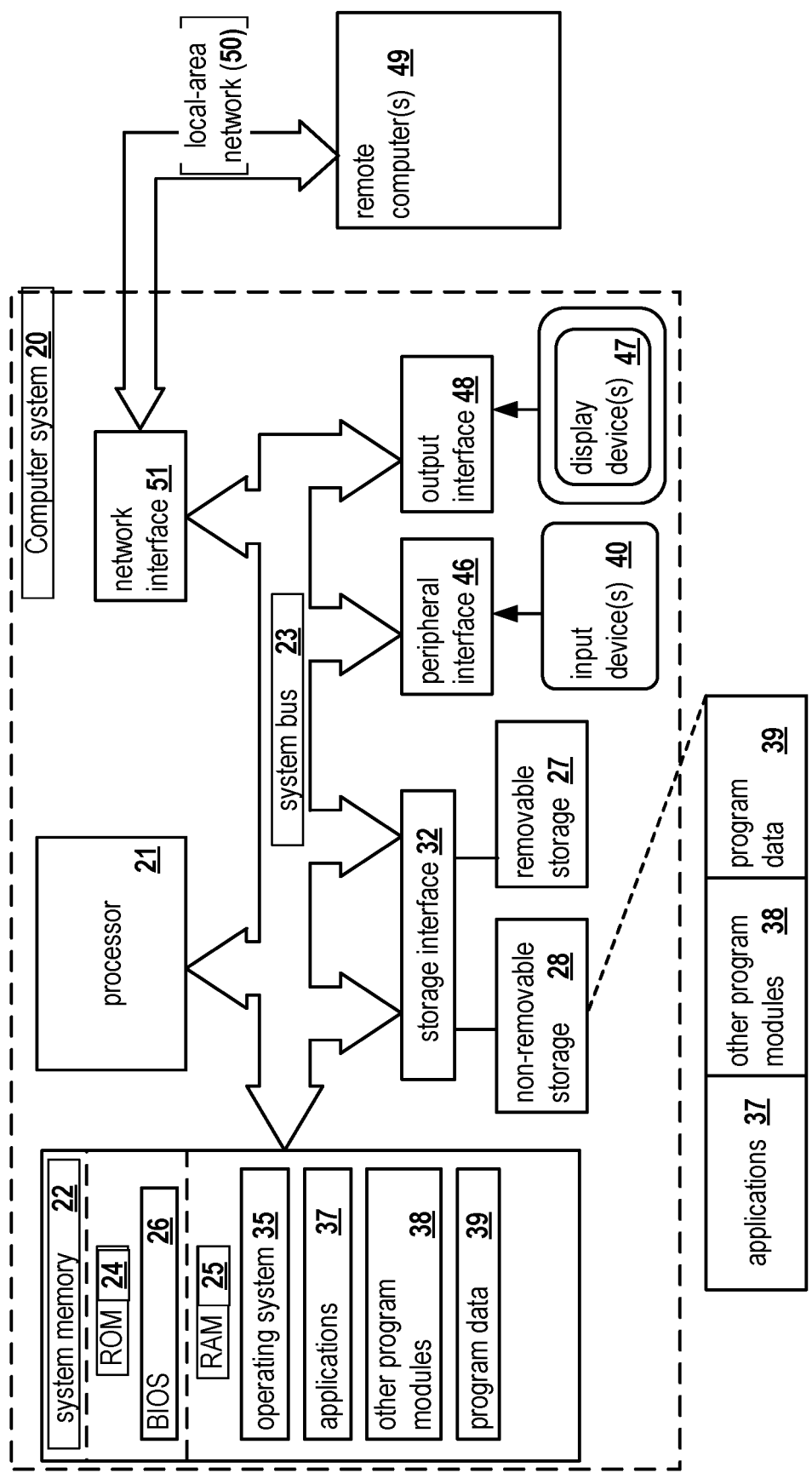
FIG. 11 presents an example of a general purpose computer system on which aspects of the present disclosure can be implemented.

In the present disclosure, the process blocker 110, data collector 120, data access rights manager 130, modifier 140, storage device 150, anonymizer 160, analyzer 170, and retrieval record 180 denote real devices, systems, components and groups of components constructed with the use of hardware such as integrated microcircuits ("application-specific integrated circuit", or ASIC) or programmable gate arrays ("field-programmable gate array", or FPGA), or, for example, in the form of a combination of software and hardware such as a microprocessor system and a set of program instructions, and also on neuromorphic chips (in English, "neurosynaptic chips"). The functionality of said means may be implemented solely by hardware, or additionally in the form of a combination in which some of the functionality is implemented by software and some by hardware. In some aspects, the various means for granting a user data processor access to a cryptocontainer of user data may be implemented on the processor of a general-purpose computer (as shown in FIG. 11, for example). Databases may be implemented by any feasible methods and may be contained on a single physical medium or on various media located either locally or remotely.

Figure 2:
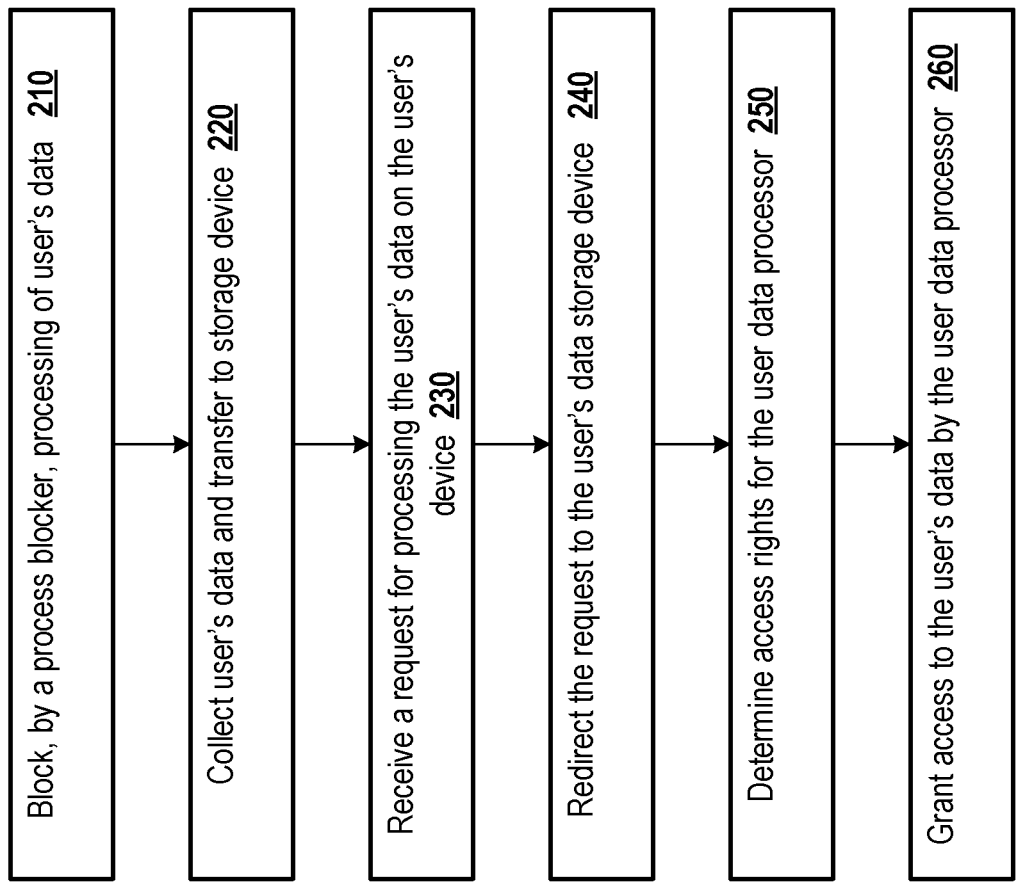
FIG. 2 illustrates a method of granting access to a user's data to a user data processor.

FIG. 2 illustrates a method 200 of granting access to a user's data to a user data processor. The system 100 described above may be used for executing the method 200.

In step 210, the process blocker 110, blocks the processing of the user's data at the user's devices for the user data processor. Various methods of processing user data are blocked for various user data processors.

In one aspect, the following methods of processing user data are blocked:
mobile and web tracking, for example, by:
 tracing and removing trackers from devices,
 using a VPN service enabling trackers and advertisements to be cut out of the network traffic;
collecting geolocation information, for example, by:
 using virtual operators,
 spoofing ("spoofing" in English) geolocation,
 switching off GPS, Wi-Fi and Bluetooth modules when they are not being used by the user;
collecting search queries, for example, by:
 using private search systems (for example, DuckDuckGo),
 proxying outgoing search queries,
 spoofing ("spoofing" in English) the identifiers of search systems in outgoing traffic,
 removing the identifiers of search systems in outgoing traffic; and
collecting registration data, for example using:
 anonymous telephone numbers and mailboxes,
 anonymous one-time maps.

In step 220, the user's data is collected by the data collector 120 and transferred to the storage device 150. In one aspect, the user's data that is collected comprises the data blocked for processing by external user data processor 102 according to the current policies. The policies are applied by the data access rights manager 130 and implemented via the data model/structure described above. In one aspect, the transferring of the collected data to the storage device 150 is performed through the modifier 140 and/or the anonymizer 160.

In one aspect, access to these data by user data processor 102 which are not, for example, on the list of permitted user data processors, or for which the data are not necessary for providing their basic functionality, may only be received from the storage device 150.

In step 230, the system 100 receives a request for processing the user's data on the device 101. This request may be received by various means of the system 100, depending on the method of implementation. For example, if there is an attempt to process the user's data on the device, this is detected by the process blocker 110 (implicit request). For an explicit request, permission for processing this request will be received by the data access rights manager 130.

In one aspect, if the processing request is received by the process blocker 110, this request is redirected to the data access rights manager 130. If the user data processor from which the request is received is known to the system 100 (e.g., if rights have already been allocated to this means), the method proceeds to step 240.

In step 240, the request is redirected to the user's data storage device 150.

In one aspect, when the user data processor 102 is not known to the system, access rights are determined for the user data processor 102. Then, the method proceeds to step 240 to enable the user data processor 102 to process the user's data without redirecting the request to the storage device 150. In other words, when the user data processor 102 is on the listed of trusted means, or access to these data takes place in the context of basic functionality accepted by the user, or in other cases mentioned above, the user data processor 102 is permitted to process the user's data without redirecting it to the storage device 150.

In step 250, the storage device 150 determines the access rights of the user data processor 102 to the user's data, for which purpose the storage device may use their copy of the access rights base for the user data processor 102, drawn up by the data access rights manager 130, or may contact the data access rights manager 130 directly, through the agent 130a, for example. After the determination of rights, in step 260, access to the user's data is granted to the user data processor in accordance with the determined rights.

In one aspect, access is granted through the anonymizer 160, which executes the reverse conversion of the user's data located in the storage device 150. Information about this is recorded by the retrieval record 180. In one aspect, the recording is based on blockchain technology. In one aspect, the technology for supplying data for processing from the user to the user data processor 102 may be implemented as a smart contract, in which the incoming offer from the owner of the user data processor 102, in a particular case, is the cashless use of an application/program functionality (user's data in exchange for the functionality). In this example, after access to the processing of the user's data has been received, the user who has granted access to his data may use the functionality of a certain application or service, or he/she will be able to access any other product or service, optionally encrypted (for example, an insurance discount in a case where remote metering from a car is provided).

Figure 2A:
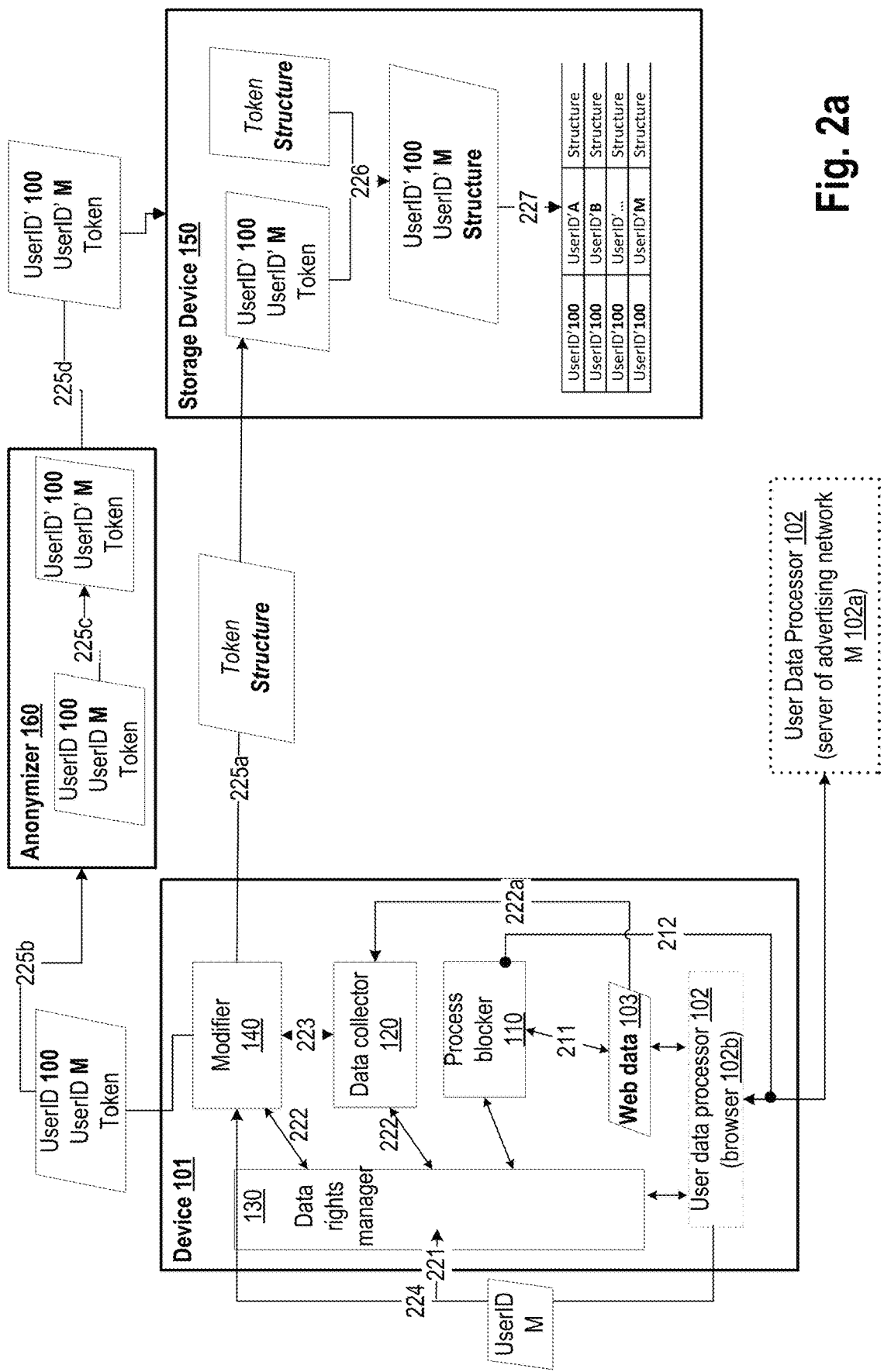
FIG. 2a illustrates an aspect of a method for providing a user's data to user data processor during a transfer of data structure from the user's device to a remote storage device.

FIG. 2a illustrates an aspect of a method for providing a user's data to a user data processor. For example, this aspect may be used during a transfer of data from the user's device to a remote storage device. The process blocker 110 blocks the processing of data for an advertising network M. The blocking takes place by removing from web data 103, including data created by a browser 102b, cookie files containing an advertising identifier, in step 211, and spoofing the user's identifier in the advertising network M in network traffic, in step 212. This impedes the operation of the user data processor 102, which in the present case, is used for user profiling (by profiling means, not shown). Thus, the advertising network will not be able to carry out targeting since it does not have the user profile, resulting in a marked reduction in conversion (the number of clicks on an advertising announcement), and since the operating model of the advertising network is CPC ("cost per click"), there is a corresponding decline in revenue per user, ARPU (average revenue per user). Similar blocking is used by the user, since the user wishes to avoid the appearance of advertising for certain categories X of goods in his browser (for example, medicines, medical clinics and other items in the "health" category). However, the user is prepared to receive targeted advertising for other categories of goods and services from said advertising network M. Thus, after the specified settings, in step 221, the data access rights manager 130 defines the rights for the network M to the history of search queries and the clickstream, excluding search queries and clicks relating to category X. In step 222, the relevant information is sent out to the system 100. In particular, the data collector 120 receives the data structure with fields for population, the modifier 140 receives categories of data whose transfer is prohibited, and the storage device receives the access rights for the advertising network M.

In particular cases, various scenarios are then possible, for example:

- the data collector 120 collects all the search queries and clicks from the user's devices 101, all the data are sent to the storage device 150, and the storage device 150 independently generates (or in a particular case completes) the structure for processing by the user data processor 102 of the advertising network M in accordance with the data access rights, having excluded the clicks and search queries from category X;
- the data collector 120 collects all the search queries and clicks from the user's devices 102, all the data are sent to the modifier 140, and the modifier 140 removes substructures relating to category X and moves the modified structure to the storage device 150, and in this form, it will be transferred to the user data processor 102 of the advertising network M;
- the data collector 120 collects the search queries and clicks not relating to category X and moves the structure to the storage device 150, and in this form, it will be transferred to the user data processor 102 of the advertising network M; and
- the data collector 120 collects the search queries from all categories and the clicks not relating to category X, and the structure is transferred to the modifier 140, the modifier 140 removes search queries relating to category X from the received structure and transfers the modified structure to the storage device 150, and in this form, it will be transferred to the user data processor 102 of the advertising network M (the example in FIG. 2a, which will be considered subsequently, relates to this scenario).

As a general rule, such scenarios apply not only to clicks and search queries, but also to other types of user's data, where this is possible, and the user data processor 102 do not only relate to advertising networks, and the user may have more than one device. In one aspect, when the storage device 150 is located in a remote unit, as in FIG. 2*a*, the modified structure from the modifier is not sent directly to the storage device 150.

An example according to the last scenario is considered further below. In step 221, the rights for the user data processor 102 of network M have been defined by the data access rights manager 130. In step 222, the data access rights manager 130 transfers the format of the structure to the data collector 120 for the population of the fields. The structure comprises at least a "search queries" field and a "clickstream" field, and in turn the clickstream field comprises a field of categories of web resources in which a field for category X is absent.

In step 222*a*, the data collector 120 populates the fields. The data for population, in one aspect, are selected from the retained web data 103 accumulated in the course of the user's network activity. These data are formulated both by the browser 102*a* and by additional means of the system 100, such as plug-ins in the browser or UI interceptors (these are not shown in FIG. 2*a*, and in a particular case are modules of the data collector 120).

In step 223, the data collector 120 transfers the populated structure to the modifier 140, which in turn, based on the structure format received in step 222 from the data access rights manager 130, analyzes the fields of the search queries for the presence of queries relating to category X. Then, the query data is removed.

In step 224, the modifier 140 receives from the user data processor 102 the user identifier in the advertising network M (UserIDM) (for example, from the cookie file or from a profile in the browser) and the user identifier in the system 100 (UserID100) from the data access rights manager 130 (not shown in FIG. 2*a*).

The structure with the user's data is then encrypted with a public key, and a pair of identical random tokens is generated. One of the tokens is linked to the identifiers, while the second token is linked to the user's data structure (for example, it is added in an additional field to the structure, this step not being shown in FIG. 2*a*).

In step 225*a*, the user's data structure is then sent to the storage device 150, and the identifiers with the second token are sent to the anonymizer 160 in step 225*b*. In step 225*c*, the anonymizer 160 converts the identifiers, and in step 225*d*, the converted identifiers UserID'100 and UserID'M are transferred to the storage device 150.

In step 226, by the storage device 150, the identifiers are linked with the user's data structure based on finding identical tokens. In step 227, the storage device 150 links the received data structure with other data structures for this user.

The anonymizer 160 changes the original user identifier in the system 100 and the identifier for the advertising network M, in order to protect the user's data in case of a data leak from the storage device 150, since the data owner cannot be recognized with the changed identifiers. The data requests from the advertising network M for the processing of the data are redirected to the storage device 150 through the anonymizer 160, as shown in FIG. 2*b*.

Figure 2B:
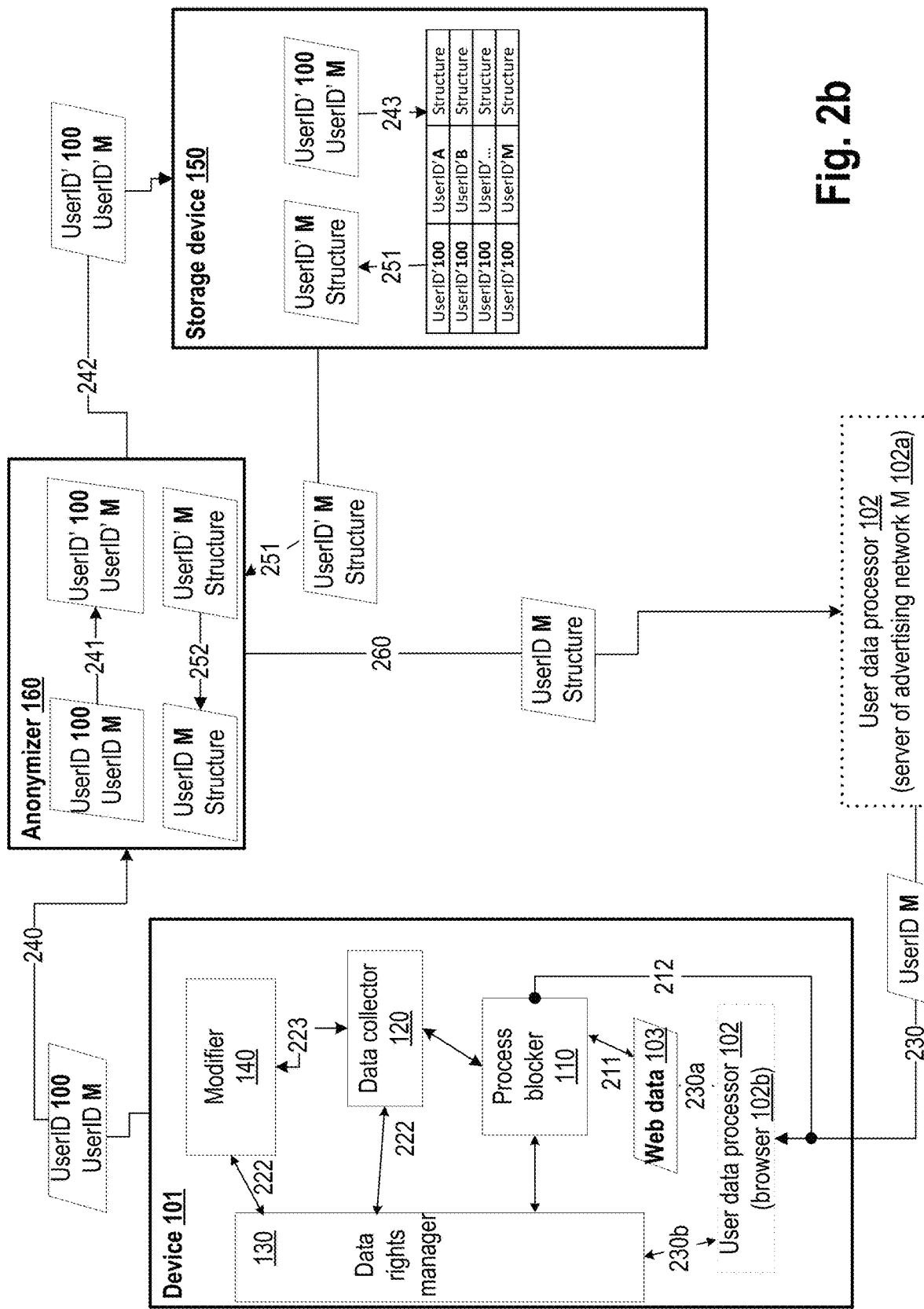
FIG. 2b illustrates an aspect of a method for providing a user's data to user data processor in the transfer of a data structure from a storage device to a user data processor.

FIG. 2*b* illustrates an aspect of a method for providing a user's data to user data processor, e.g., in the transfer of a data structure from a storage device to a user data processor. As can be seen in FIG. 2*b*, the request can be directed by the server through the client in step 230, or by the client itself in accordance with its functionality, in step 230*a* and/or in step 230*b*.

In one aspect, the request comprises a user identifier in the advertising network M, UserIDM. In step 240, the request is redirected to the anonymizer 160. When the request is redirected, the user identifier in the system 100 is attached to the request, and, in a particular case, information about the requested data, for example the enumeration of the fields of the structure is added; there may be various formats such as XML, JSON, etc.

In step 241, the anonymizer 160 converts the user identifier in the system 100 and the identifier in the advertising network M, and it transfers the converted identifiers to the storage device in step 242.

The storage device 150 detects, in step 243, the data linked to the user, on the basis of UserID' 100, and determines the rights for the advertising network M, in step 250 (not shown in FIG. 2*b*), and the storage device 150 prepares the data for processing by the user data processor 102 in accordance with the access rights. In the present example, this takes place by means of the detection of UserID'M and the data structure related thereto.

In step 251, when the data is detected, it is returned, together with the UserID'M, to the anonymizer 160. In step 252, the anonymizer 160 returns the original value to the user identifier in the network M. The user's data, together with the original UserIDM, is transferred to the user data processor 102 of the advertising network, while the occurrence of the transfer is recorded by the retrieval record 180.

In one aspect, the advertising network may contact the anonymizer 160 directly without the redirection of requests by the device 101, while in the present case the user data processor 102 itself redirects the request: instead of the device 101 it contacts the storage device 150, in a particular case through the anonymizer 160.

In another aspect, the data is not transferred to the user data processor 102, but access to a copy of the data placed in the storage device 150 is granted.

The system shown in FIG. 1 is also used for implementing the method 300 of updating the user's data, as shown in FIG. 3. This method is implemented when not all the data for processing are placed in the storage device 150 and/or when the user has more than one device from which data may be received.

In the present method, steps 210, 230, 240 and 250 are similar to the steps of the method shown in FIG. 2. The method 300 then proceeds from step 250 to step 310.

In step 310, the storage device 150 detects that the data for which the user data processor have received access rights is not located in the storage device 150.

In step 320, therefore, the user's data missing from the storage device 150 is transferred from the user device to the storage device 150. In one aspect, when the absence of the data in the storage device is detected, the storage device 150 contacts the data access rights manager 130.

The data access rights manager 130 updates the data model, in accordance with which the data collector 120 populates new fields in the structure (in the present example, those relating to the location). The data access rights manager 130 then sends the data to the storage device 150.

In one aspect, the data are sent with the use of the modifier 140 and the anonymizer 160, if the detected data requires further conversion. The modifier 140 carries out an analysis of the data for criticality and other conformity with the rights established by the data access rights manager 130.

Figure 3A:
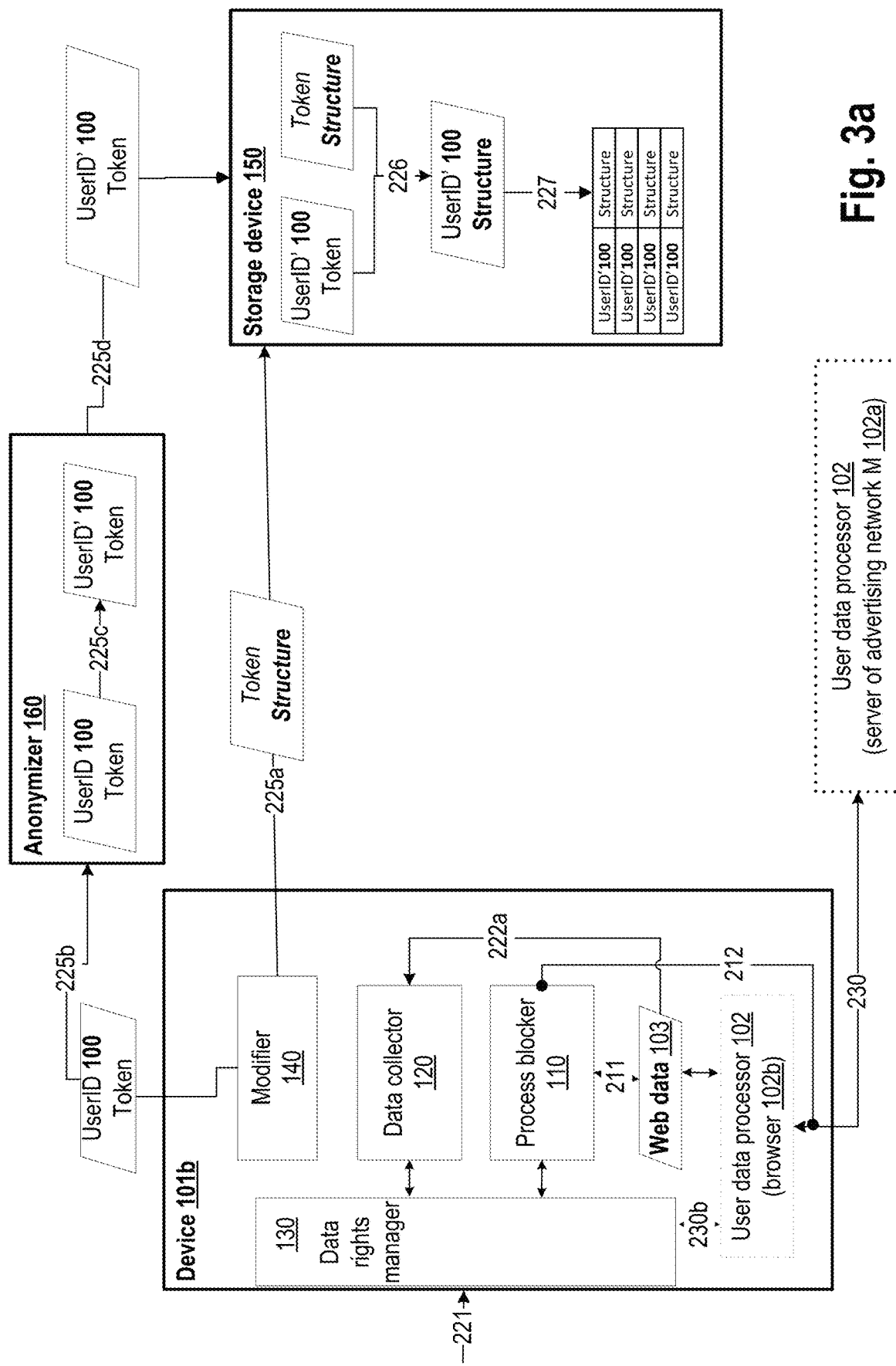
FIG. 3a illustrates an aspect of a method for updating a user's data in a transfer of a data structure to a remote storage device.

FIG. 3 illustrates a method 300 for renewing a user's data in a storage device. FIG. 3*a* illustrates an aspect of the method for updating a user's data in a transfer of a data structure to a remote storage device. An example with the advertising network M will be considered further.

In the present case, however, the system 100 operates according to the following scenario:
- web tracking is blocked in advance (steps 211, 212) in the device 101*b* (a PC, in the present example),
- the data collector 120 collect all the user's search queries and clicks in step 222*a* (as the most widespread data for processing),
- the collected data are sent to the storage device 150 (steps 225*a*-227), and the storage device 150 then independently creates the structure for processing by the user data processor in accordance with their access rights.

In addition to information on search queries and clicks, the advertising network M in the present example has requested information on the location: in step 230, the server 102*a* sent a request to the client 102*b*, which sent it to the data access rights manager 130 in step 230*b*. The user issued this permission, in step 221, and the data access rights manager 130 drew up rights, including rights to location data.

FIG. 3*b* illustrates an aspect of the method 300 for updating a user's data in a transfer of an updated data structure to a storage device. Since the storage device 150 independently creates or populates data structures for processing by the user data processor 102.

In step 240, when the request is redirected through the user identifier UserID100, information about the data to which rights have been defined for the advertising network M is added to the request. The information about the data is added in the form of fields of the data structure. In FIG. 3*b*, this is denoted "Model", for example.

In step 242, the storage device 150 receives the converted user identifier UserID'100 and the fields of the data structure from the anonymizer 160, and, in step 243, it finds the user's user's data in the store.

The storage device 150 then determines the access rights to the data, for which, in our example, the storage device 150 compares the fields of the structure (taken from the "Model") attached to the request with the data located in the storage device. Then, in step 310, it detects (not shown in FIG. 3*b*) that the information about the user's location UserID' 100 has not been placed on the storage device 150 (as a result, a population error, for example, appears). The storage device 150 contacts the data access rights manager 130 with a request for data shown in the structure but absent from the storage device 150. The data access rights manager 130 is contacted, for example, through an agent 130*a*, which in step 311 will contact the anonymizer 160 and, in step 312, will convert the identifier UserID' 100 in the request to the original UserID100 with the aid of the anonymizer 160, and will transfer the request to the data access rights manager, in step 313. According to the results of the request from the storage device 150, the data access rights manager 130 updates the information about the data to be collected, where the updating includes at least two steps:
- detecting, among the user's devices, the devices that may provide the requested data (in the example considered here, it is a mobile telephone 101*a*);
- updating the fields of the structures (in the present example, adding the "location" field) for the data collector 120, particularly in the devices where fields containing the requested data are added; in the present example, this is step 314.

In step 320, the storage device receives the requested data. In the example under consideration, in step 320, FIG. 3 consists of a number of sub-steps (320*a*-320*f*) as shown in FIG. 3*b*. In step 320*a*, the updated user's data structure with information including the location is sent to the storage device 150, and the user identifier in the system 100 with the second token is sent to the anonymizer 160, in step 320*b*. The anonymizer 160 converts the identifier in step 320*c*, and the converted identifier UserID' 100 is transferred, in step 320*d*, to the storage device 150. In the storage device 150, in step 320*e*, the identifier is linked with the updated user's data structure based on finding identical tokens. The storage device 150 then links the received data structure to other data structures for this user in step 320*f*. The storage device can then complete the necessary fields at the request of the user data processor 102.

An example of the implementation of the method 200 for providing user's data to user data processor will now be considered based on FIGS. 2*a*-2*b*. The process blocker 110 blocks the processing of data for an advertising network M; more specifically, it blocks the collection of URL addresses/resources that the user visits (clickstream) and the history of search queries.

The blocking is carried out by:
- in step 211, removing from the web data 103, including data created by a browser 102*b*, cookie files containing a temporary user identifier in the advertising network M installed by scripts on web pages;
- in step 212, in the network traffic, spoofing the permanent user identifier in the advertising network M, which is identical to the log-in of the account with which the user has entered the browser; and
- spoofing the identifier of the browser installation 102*b* in the network traffic.

Based on the clickstream and search queries, the advertising network M carries out profiling, followed by the targeting of advertising messages. Thus, the advertising network will not be able to carry out targeting since it does not have the user profile, resulting in a marked reduction in conversion (the number of clicks on an advertising announcement), and since the operating model of the advertising network is CPC (cost per click), there is a corresponding decline in revenue per user, ARPU (average revenue per user). Similar blocking is used by the user, since the user wishes to avoid the appearance of advertising of goods in the "health" category in his browser (for example, medicines, medical clinics and other items from the "health" category). However, the user is prepared to receive targeted advertising for other categories of goods and services from said advertising network M ("Sport", "Education", "Books", . . . , "N"). The user is prepared to share only the history of search queries and the web resources visited for profiling.

Figure 4:
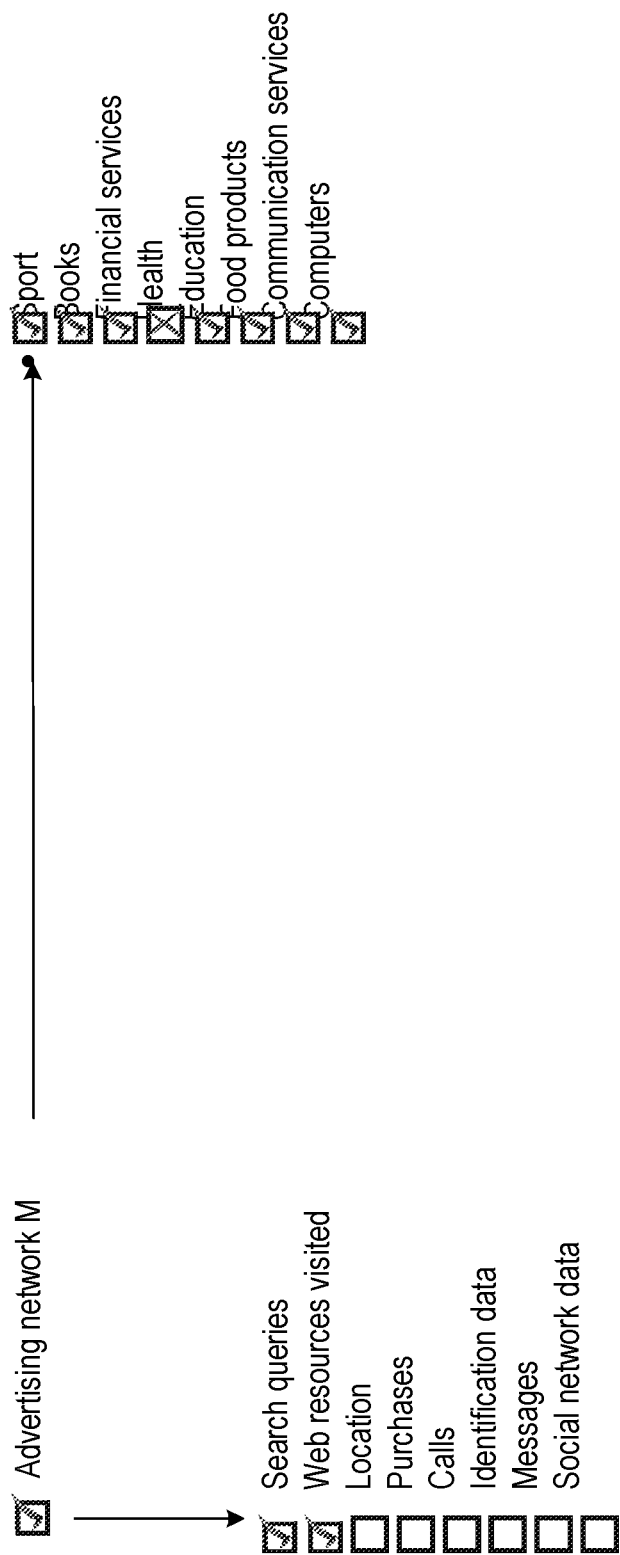
FIG. 4 illustrates an example of a configuration of data permissions.

FIG. 4 illustrates an example of a configuration of data permissions. Configurations of data permissions are specified in step 221. The system 100 also blocks any advertising announcements not wanted by the user, by the process blocker 110. In step 212, the process blocker 110 will remove advertising data with unwanted content from the traffic and block the loading of the advertising data with unwanted content, namely advertising data and content relating to the "health" category.

Thus, after the specified settings, in step 221, the data access rights manager 130 defines rights for the advertising network M to the whole history of search queries and the clickstream, excluding search queries and clicks relating to the "health" category. The information relating to this is sent out to the system 100, in step 222. Thus, in step 222, the data collector 120 receives the data structure with fields for population, and the structure comprises the following fields:

search queries;
web resources visited;
  art;
  entertainment;
  business;
  games;
  general;
  job seeking;
  etc.

In the present step, the data collector 120 is ordered to collect all the search queries and all the web resources visited that cannot be assigned to the health category. Profiling for targeting advertising materials in the "health" category may be used by various categories of web resources, and therefore the data access rights manager 130, when creating a structure for the means 120, reduces the general category of "health" to more partial categories (subcategories) of web resources, and does not include them in the fields of the structure for the means 120, for example, such subcategories of web resources as medicines, medical services, medical information portals and the like.

```
StructureForM = }"Search queries": [ ],
    "URL-resources": {
        "Sport": [ ],
        "Art": [ ],
        "News": [ ],
        "Cars": [ ],
        "Games": [ ],
        ...
    }
}
```

In step 222, the modifier 140 receives the categories of search queries whose transfer is prohibited. The modifier 140 uses a natural language processing technology to analyze and classify the search queries. In step 222, the storage device 150 receives the access rights for the advertising network M.

Then, in step 222a, the data collector 120 collects the search queries from all categories and the web resources visited that do not relate to the "health" category, and populates the fields of the structure. The data for the population of the structure are selected by the data collector 120 from the retained web data 103 accumulated in the course of the user's network activity. These data are created both by the browser 102a and by additional means of the system 100, such as plug-ins in the browser or UI interceptors (these are not shown in FIG. 2a, and are modules of the data collector 120).

Example of a structure format:

```
StructureForM = {"Search queries": [R1, R2, R3,..., Rn],
    "URL-resources": {
        "Sport": [URL1, URL2, URL3, ..., URLn],
        "Art": [URL1, URL2, URL3, ..., URLn],
        "News": [URL1, URL2, URL3, ..., URLn],
        "Cars": [URL1, URL2, URL3, ..., URLn],
        "Games": [URL1, URL2, URL3, ..., URLn],
        ...
    }
}
```

In step 223, the populated structure is transferred to the modifier 140.

Based on the information about the prohibited categories received, in step 222, from the data access rights manager 130, the modifier 140 analyzes the fields of the search queries for the presence of queries relating to the "health" category. The search queries relating to the "health" category (in the present example, this is query R3) are then removed from the received structure. In step 224, the modifier 140 receives from the user data processor 102 the user identifier in the advertising network M (UserIDM) from the cookie file or from a profile in the browser, and the user identifier in the system 100 (UserID100) from the data access rights manager 130 (not shown in FIG. 2a). The structure with the user's data, comprising the search queries and URL-resources, is then encrypted with a public key (Rn→Rn', URLn→URLn'). The modifier 140 generates a pair of identical random tokens. One of the tokens is linked to the identifiers UserIDM and UserID100:

User {"ID":[UserIDM, UserID100], "Token": token}.

The second token is linked to the user's data structure (it is added in an additional field to the structure:

```
StructureForM = {"Search queries": [R1', R2', ..., Rn'],
    "URL-resources": {
        "Sport": [URL1', URL2', URL3', ..., URLn'],
        "Art": [URL1', URL2', URL3', ..., URLn'],
        "News": [URL1', URL2', URL3', ..., URLn'],
        "Cars": [URL1', URL2', URL3', ..., URLn'],
        "Games": [URL1', URL2', URL3', ..., URLn'],
        ...
    }
    "Token": token
}
```

In step 225a, the user's data structure is then sent to the storage device 150, and the identifiers with the second token are sent to the anonymizer 160 in step 225b. The anonymizer 160 converts the identifiers in step 225c. The anonymizer 160 changes the original user identifier in the system 100 and the identifier for the advertising network M, in order to protect the user's data in case of a data leak from the storage device 150, since the data owner cannot be recognized with the changed identifiers:

User={"D": [UserIDM, UserID100], "Token": token}→
User={"D": [UserID'M, UserID'100], "Token": token}→

The converted identifiers UserID' 100 and UserID'M are transferred, in step 225d, to the storage device 150. In the storage device 150, the identifiers are linked with the user's data structure on the basis of identical tokens, in step 226.

The storage device 150 links the received data structure with other data structures for this user in step 227:

```
DataForUserID'100 = { "UserID'M": StructureForM,
    "UserID'K": StructureForK,
    ...
}
```

The data requests from the advertising network M for the processing of the data are now redirected to the storage device 150 through the anonymizer 160, as shown in FIG. 2b. As can be seen in FIG. 2b, the request is sent by the server 102a through the browser 102b, in step 230. The request comprises a user identifier in the advertising network M, UserIDM. In step 240, the request is redirected to the anonymizer 160. When the request is redirected, the user identifier in the system 100 is attached to the request:

User {"ID": [UserIDM, UserID100]}.

In step 241, the anonymizer 160 converts the user identifier in the system 100 and the identifier in the advertising network M:

User {"ID": [UserID'M, UserID'100],}.

In addition, in step 242, it transfers the converted identifiers to the storage device 150. The storage device 150 detects, in step 243, the data linked to the user, on the basis of UserID'100, and determines the rights for the advertising network M in step 250; in the present example, this takes place by means of a search for UserID'M and its associated data structure. When the data are detected, they are returned, together with the UserID'M, to the anonymizer 160, in step 251. In step 252, the anonymizer 160 returns the original value to the user identifier in the network M, and the user's data, together with the original UserIDM, is transferred to the user data processor 102 of the advertising network, while the occurrence of the transfer is recorded by the retrieval record 180.

In one aspect, the advertising network may contact the anonymizer directly without the redirection of requests by the device 101, while in the present case the user data processor itself redirects the request: instead of the device it contacts the storage device, in a particular case, through the anonymizer 160. In another aspect, the data is not transferred to the user data processor 102, but access to a copy of the data placed in the storage device 150 is granted.

The system shown in FIG. 1 is also used for implementing the method of updating the user's data 300. This method is implemented when not all the data for processing are placed in the storage device and/or when the user has more than one device from which data may be received. In the present method, steps 210, 230, 240 and 250 are similar to the steps of the method shown in FIG. 2.

In step 310, the storage device detect that the data for which the user data processor have received access rights are not located in the storage device.

In step 320, the missing user's data is transferred from the device to the storage device. In one aspect, when the absence of the data is detected, the storage device 150 contacts the data access rights manager 130. The data access right manager 130 updates the data model, in accordance with which the data collector 120 populates new fields in the structure (in the present example, those relating to the location). The data access rights manager 130 then sends the data to the storage device 150. In a particular case, the data are sent with the use of the modifier 140 (the means 140 carries out an analysis of the data for criticality and other conformity with the rights established by the data access rights manager 130) and the anonymizer 160, if the detected data require further conversion.

Figure 5:
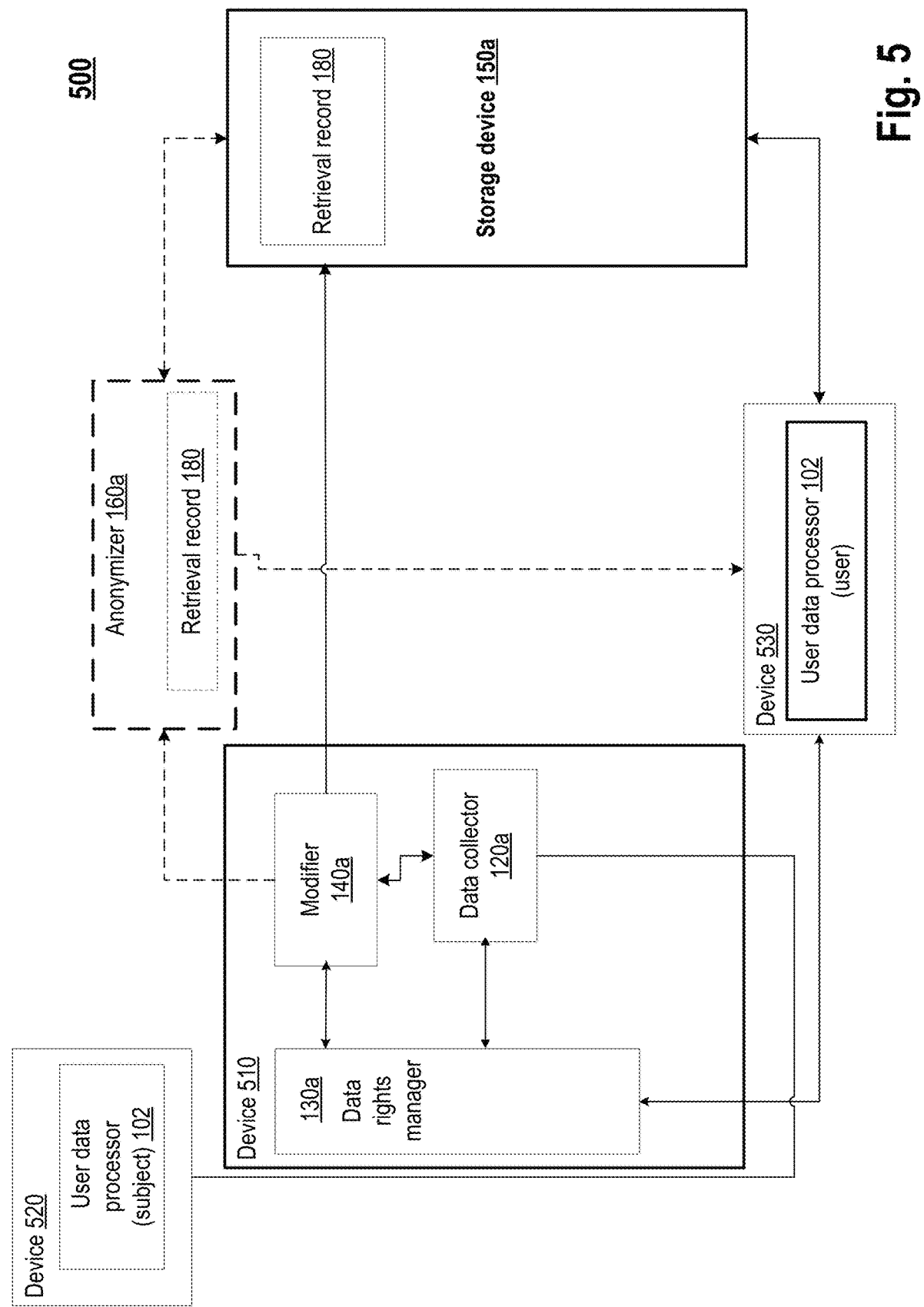
FIG. 5 illustrates an exemplary system for exchanging a user's data, designed for granting access to the user's data via a cryptocontainer.

FIG. 5 illustrates an exemplary system for exchanging a user's data, designed for granting access to the user's data via a cryptocontainer.

A "cryptocontainer" comprises a file that has a specified structure (examples of structures are described below), comprising at least a fully encrypted selection of the elements of the user's data.

The process of encryption and decryption of the data is carried out automatically by the system 500, and is completely transparent to the user. Cryptocontainers may be used to exchange large volumes of confidential information that must be edited for different users. In a particular case, the selection of data elements is created in the form of a file system, where each data element is a file. The system 500 includes an administration device 510, a data subject device 520 and a data user device 530.

In one aspect, the functions of the administration device 510 and the data subject device 520 are performed by a single device. The system 500 also includes a data collector 120a, data access rights manager 130a, modifier 140a, storage device 150a, anonymizer 160a (optionally), and retrieval record 180.

The data is collected from the device 520 by the data collector 120a of the device 510. The data collector 120a transfers the data to the modifier 140a. With the aid of the modifier 140a, using the received data, a cryptocontainer is formed (created) (if no previous suitable container has been created; otherwise the existing container is modified), and this cryptocontainer is transferred to the storage device 150a. When access to the user's data is requested by the device 530, the rights are issued via the data access rights manager 130a, and the cryptocontainer (referred to hereafter as the "container") is modified via the modifier 140a. The user data processor 102 of the device 530 is granted access to a copy of the container by the storage device 150a. In order to receive access to the user's data via the container, the container must first be formed, after which the user data processor 102 are granted access to the data elements in the container through a modification of said container by the means 140a. In another aspect, the forming of the container and the granting of access to the user's data and to the copy of the container may take place in a single iteration.

Figure 6:
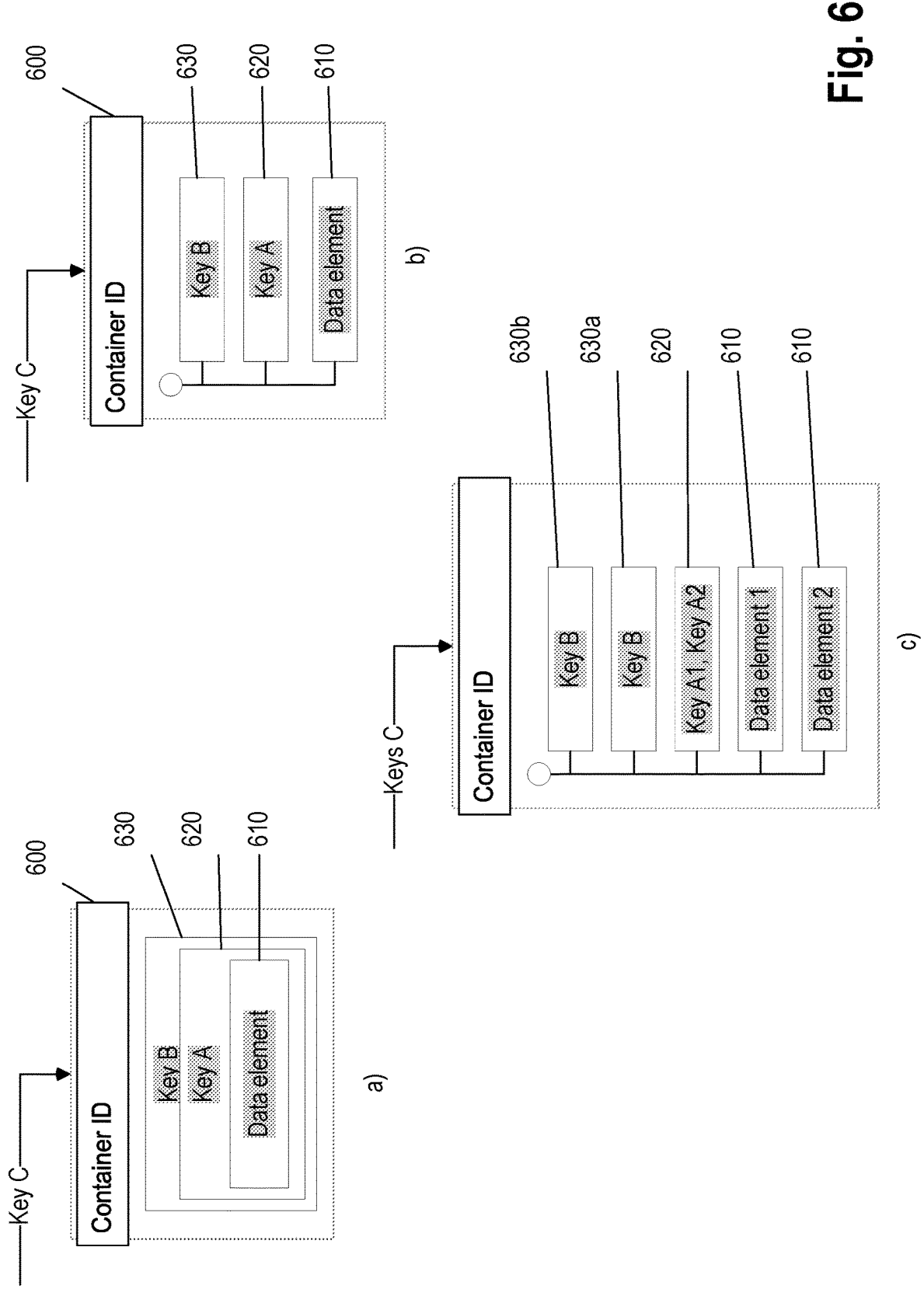
FIG. 6 illustrates examples of containers.

FIG. 6 illustrates examples of containers 600. A container 600 contains at least one data element 610, containing a user's data. A data element is the smallest indivisible (elementary) unit of data for the purposes of the storage method. Examples of data elements 610 include files relating to a file system (in this case, an encrypted selection of data elements is a file system), entries in tables relating to relational databases (an encrypted selection of data elements is a table), and fields relating to data structures in non-relational data bases (an encrypted selection of data is determined from the structure of the database), and others. In an individual user profile, the data elements 610 may be specialized profiles which combine information about the user relating to a single category (for example, medical history, legal information, information about the user as a consumer, etc.). Each data element is encrypted. Various algorithms known from the prior art may be used for the encryption. The encrypted data element, or the encrypted selection of data elements, forms a part of the container structure, together with a structure for access to the data elements 620 (or to the data elements, if there are at least two of them) and the access structure for the user data processor 630. A key (referred to hereafter as key A) is kept together with the encrypted data element, for the decryption of the data element.

Key A is stored in the access structure for the element 620. Key A is also encrypted. Key A may be encrypted by means of various algorithms. In one aspect, key A is a combination of at least two keys, for example a public and a private key or keys for the decryption of data elements, when there are at least two such elements.

The key for access to key A (key B) is stored in the access structures for the user data processor 630. In a particular case, key B is a combination of at least two keys, for example a public and a private key. Key B is used for the encryption of key A, and for its decryption when data are read or written. Key B is also encrypted.

Key B is encrypted by a key (key C) linked to the user data processor 102. Each user data processor is linked to its own key C. In a particular case, key C is a combination of at least two keys, for example a public and a private key. Key C is either created specially via the modifier 140a for the container, or is received from the user data processor 102 for which the modifier 140a form the structure 630. The keys C are used to divide the rights of access to the container among different user data processor 102. Each user data processor 102 has its own unique key Cn (a key Cn is a member of a plurality of keys C), which it uses for operations with the container. It is therefore advisable for each user data processor to store its key Cn in a reliable way, to ensure that one user data processor 102 cannot receive the key of another user data processor.

A container may be formed in various ways. In one aspect, the container may be a frame, as shown in FIG. 6a, for which key A encrypts the data element 610, and then key A is encrypted by key B together with the encrypted data element 610, and the result is jointly encrypted by key B and key C.

In another aspect, the container takes the form of a structure containing encrypted objects, as shown in FIG. 6b, and the elements of this structure are:
  an encrypted data element 610 (at least one);
  a structure for access to the element 620, having at least one encrypted key A; and
  an access structure 630 for the user data processor, having at least one key B encrypted by key C.

There may be more than one access structure 630 for the user data processor in the container, and the number of these structures depends on the number of user data processor 102 to which access is granted to the data in the container 600. Also, there may be more than one such data element, as in the example of the container illustrated in FIG. 6c.

Figure 7:
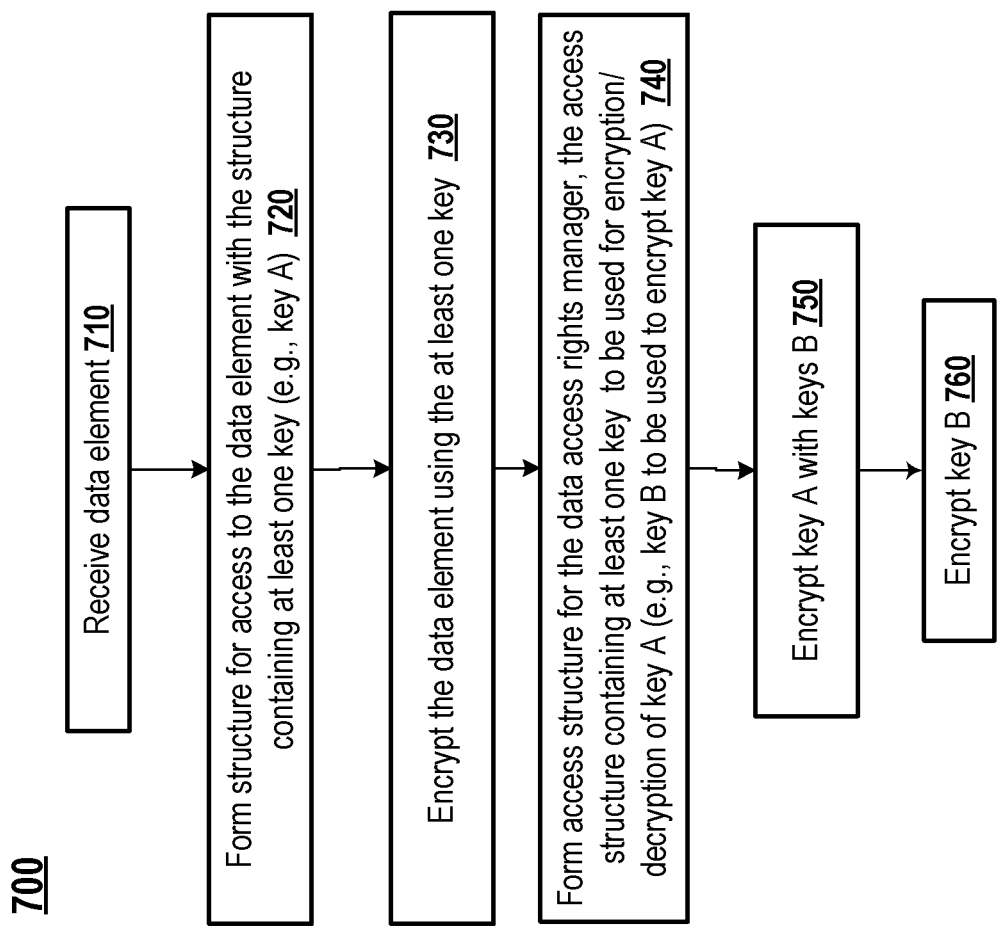
FIG. 7 illustrates an example of a method for forming a new container.

FIG. 7 illustrates an example of a method 700 for forming (creating) a new container.

In step 710, the data element 610 is received via the data collector 120a, and the data element is transferred to the modifier 140a.

In step 720, a structure for access to the data element 620 is formed via the modifier 140a for the data element 610. The structure 620 contains at least one key for the encryption of the data element 610 (key A).

In step 730, the data element 610 is encrypted via the modifier 140a, using key A.

Then, in step 740, via the modifier 140a, the access structure for the rights manager 630a is formed (a particular case of an access structure for the user data processor 630, which contains keys accessible to the means of the device 510, since the keys in said structure are encrypted by keys C from the data access rights manager 130a). The structure 630a contains a key for the encryption/decryption of key A, namely key B.

In step 750, when the structure 630a is formed, key B is received from the data access rights manager 130a and is used to encrypt key.

In step 760, Key B is then encrypted via the modifier 140a. A key from the data access rights manager 130a (key C) is used for the encryption of key B. The result is the formation of a container storing the data element 610, access to which is granted only to the means of the administration device 510. In one aspect, the formed container is located in the storage device 150a.

In one aspect, key B is a combination of keys (a public key B and a private key B), and key C is a combination of keys (a public key C and a private key C). The private key B is used to encrypt key A, and the public key C is used to encrypt key B.

Container = {ID_Container:[ID],
UAI_x:[PrivICA', PubIICA'],
ICA:[PubItem'],
Item:[Data']
}

The particular case of a formed container 600 has been described above, where:
  Item is a structure that stores an encrypted data element 610.
  Data' is an encrypted data element Data 610;
  ICA is a structure for access to the data element 620;
  PubItem is a key for encrypting the data element (key A);
  UAI_x is an access structure for the rights manager 630a;
  PrivICA is a key for encrypting the PubItem key (private key B);
  PubIICA is a key for decrypting the PubItem key (public key B);
  ID_Container is a structure that stores information about the container 600;
  ID is an identifier of the container 600; and
  PrivICA', PubIICA', PubItem' signifies that the keys (PrivICA, PubIICA, PubItem) are encrypted.

Figure 8:
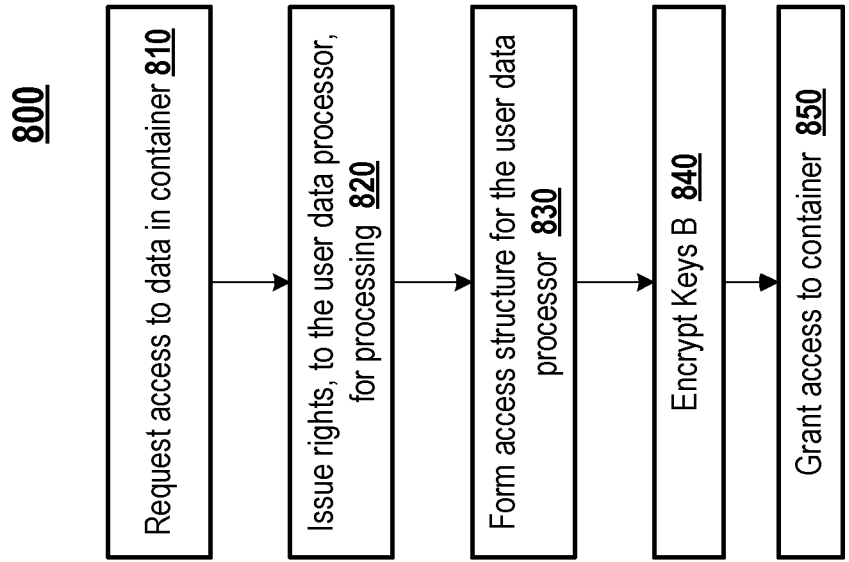
FIG. 8 illustrates an example of a method for granting a user data processor access to a previously formed container.

FIG. 8 illustrates an example of a method 800 for granting a user data processor access to a previously formed container 600 to a user data processor 102. Initially, it is only the user's data processors of the device 510 that have access to the data elements 610 in the formed container 600. Let us consider the way in which access to the user's data in the container is granted to the user data processor 102 of a third-party device 530.

In step 810, access is requested, via the user data processor 102 of the device 530, to the data in the container 600, which was formed previously and is located, for example, in the storage device 150a.

In step 820, rights for the user data processor 102 are issued via the data access rights manager 130a, and information about this is transferred to the modifier 140a.

In step 830, an access structure 630b for the user data processor 102, is formed, for which purpose the modifier 140a in the container 600 decrypt key B in the access structure for the rights manager 630a, wherein at least one decrypted key is copied (if key B takes the form of at least two keys) from the structure 630a to the structure 630b that is to be formed.

The number of copied keys depends on the rights issued in step 820. If the user data processor 102 receives rights to read the data element, key B will be copied from the structure 630a, and this will enable key A to be decrypted (where key A is required to decrypt the data element 610 in the container 600). If the user data processor 102 receives rights to write a data element 610, key B will be copied, making it possible to decrypt key A, which will be used to encrypt the added data elements 610. When the access structure 630b for the user data processor 102 has been formed (and key B has been copied), then the modifier 140a is used to receive key C for the encryption of key B in the formed access structure 630b. Said copy of key C is different from the key C used in step 750 of method 700. In the present case, the received copy of key C is linked to the user data processor 102 of the device 530.

Key C, linked to the user data processor 102, can be received in various ways via the modifier 140a. In one aspect, said key C is generated directly by the modifier 140a, while in another aspect it is received directly from the user data processor 102 or from a public source where it has been published by the user data processor 102. For example, a certificate with the private and public key may be generated on behalf of an organization with which the device 530 associated with the user data processor 102 is linked. The combination of the public and private key forms the key Co of said organization. The public key from the combination is placed in a resource of some kind (for example, a database of public keys 540), from which said key may be received by the modifier 140a.

In step 840, key B is encrypted by the received key C, via the modifier. Access to the data elements in the container 600 can now be obtained either via the user data processor of the device 510, or via the user data processor 102 of the device 530. Each party obtains access to the data element 610 with the aid of its own copy of key C. If a public key C was used to encrypt key B, then key B is decrypted by the private key C.

It should also be noted that, in most cases, it is not enough to obtain access to the user's data element. Access must be granted by the storage device 150*a* to the actual copy of the container that stores the data element. If this has not been done, then access to the copy (body) of the container in the storage device 150*a* is granted in step 850.

```
Container = {ID_Container:[ID],
    UAI_1: [PrivICA', PublICA'],
    UAI_x:[PrivICA', PublICA'],
    ICA:[PublItem'],
    Item:[Data']
}
```

A description has been given above of the particular case of a formed container 600 to which has been added an access structure for the user data processor 102, where:

UAI_1 is an access structure 630*b* for the user data processor 102.

In one aspect, as in the examples concerned with medical history below, no structure for access to the element 620 is used, and the keys for accessing the data (keys A) are contained in the access structure for the user data processor 630. In most cases, the division of the keys into two levels (the structure for access to the data element 620 and the access structure for the user data processor 630) is logically required in order that each key should have exactly one purpose. This results in two useful properties:

high productivity; and
cryptographic strength.

With this two-level division, the keys can be rotated independently of each other. In particular, in a periodic change of keys B it will be possible to replace the keys B from the access structure for the user data processor 630 without re-encrypting the data elements themselves, which are significantly greater in volume; it is sufficient to re-encrypt the keys A. This is important, for example, in the context of a file system, since access to the element data will be blocked during said service operation. Consequently, the shorter such delays are, the better. For each change of the data elements themselves, it is necessary to use a new key A for their encryption. Thus there is no accumulation of material for hacking the key.

The anonymizer 160*a* is used in the transfer of data from the device 510 to the storage device 150*a* and from the means 150*a* to the device 530 and the device 520. In one aspect, the anonymizer 160*a* converts the identifier of a container when the container is transferred to the storage device 150*a*, and carries out the reverse conversion when the container is transferred from the storage device 150*a*, or during the execution of requests for the container in the storage device 150*a* from the device 510, the device 520 and the device 530. This increases the robustness of the system 500 to leaks.

In an example below, relating to a medical history,
the copy of key A takes the form of a combination of the keys PublItem and PrivItem;
the copy of key C belonging to the Service takes the form of a combination of the keys PublService, PrivService;
the copy of key C belonging to the patient takes the form of a combination of the keys PublPatient, PrivPatient; and
the copy of key C belonging to the clinic takes the form of a combination of the keys PublClinic, PrivClinic.

In said aspect, key B is not used, in order to simplify the example.

The system for exchanging data using cryptocontainers may be applied very widely. For example, it may be used for the storage and transfer of passport data, for the exchange of data among government bodies, for the storage of a unified citizen profile, and for the control of access to parts of the profile by various organizations. Let us consider an example of the use of a variant of said system for storing and updating a medical history, which may form part of the unified citizen profile.

Figure 9:
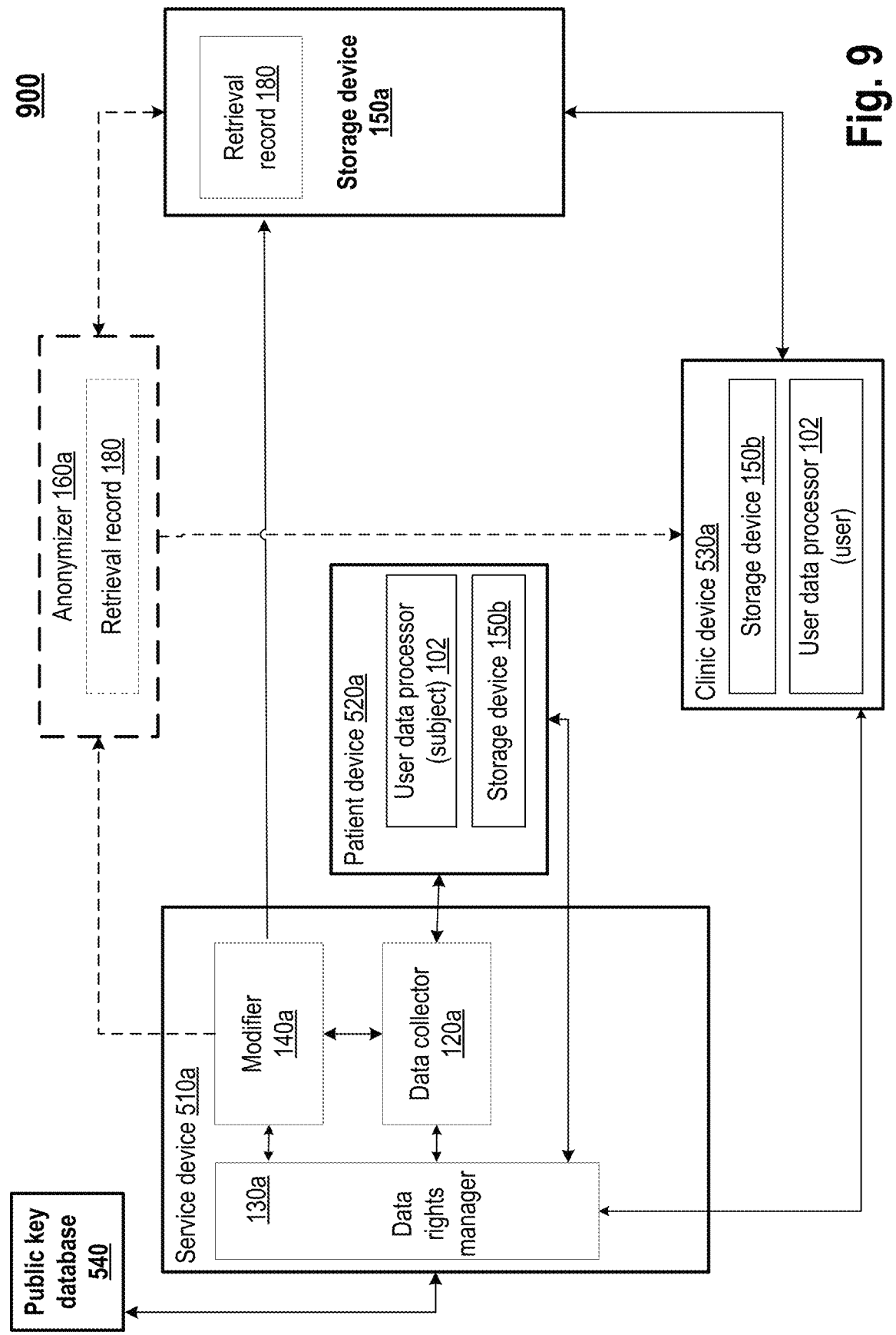
FIG. 9 illustrates an example of a system for exchanging a user's data, designed for granting access to a patient's medical history via a container.

FIG. 9 illustrates an example of a system 900 for exchanging a user's data, designed for granting access to a patient's medical history via a container. The system 900 comprises a patient device 520*a* with a user data processor 102 and a local storage device 150*b*; a health clinic device 530*a* with a local storage device 150*b* and a user data processor 102; a device of the Federal Supervision Service for Healthcare 510*a* (referred to hereafter as "the Service") with a central storage device for storing medical histories 150*a*; retrieval record 180; a public key database 540; and anonymizer 160*a* (optional).

Here, the user data processor 102 are:
a user data processor 102 in the patient device 520*a*; and
a user data processor 102 in the clinic device 530*a*.

It administers the medical history of the Service. The device 510*a* and the storage device 150*a* belong to the Service. The data collector 120*a* receives a medical history (MedicalData) and transfers it to the modifier 140*a*. The modifier 140*a* creates a pair of keys (PrivItem, PublItem), namely a public key (PublItem) for decrypting data (read access) and a private key (PrivItem) for encrypting data (write access). To simplify the example, we will consider one pair of keys, and the data element in this case will be the whole medical history. In a particular case, the modifier 140*a* may create several pairs of keys for each medical specialty (cardiology, urology, surgery, etc.), where the history for each specialty is an independent data element. The medical history received by the data collector 120*a* is encrypted by the private key PrivItem with the aid of the modifier 140*a* (MedicalData→MedicalData'). The information about this is recorded by the retrieval record 180. An access structure for the Service (UAI_Service) is then formed, the created pair of keys is placed within it and is encrypted by the Service's public key PublService (PrivItem→PrivItem', PublItem→PublItem'), and the access structure for the Service is combined with the encrypted medical history, thus forming a container:

```
Container = {ID_Container:[IDPatient],
    UAI_Service:[PrivItem', PublItem'],
    Item:[MedicalData']
}
```

The container is transferred to the storage device 150*a*. Any party having access to the storage device 150*a*, for example the patient or health clinics, may be given access to the container and the object. However, in order to obtain access to the data in the container, it is necessary to receive the rights issued by the data access rights manager of the Service 130a. The patient may receive the rights for reading only, and the health clinics may receive rights for both reading and writing. Any access to the data in the container in the storage device is recorded by the retrieval record 180. An entry in the medical history and any amendment to it may be made only in the storage device 150a. Reading may take place from local copies in local stores 150b, linked to the user data processor 102. In order to receive rights of access to the data in the container, the patient, using the user data processor 102 of the device 520a, contacts the data access rights manager 130a, where the user data processor 102 of the device 520a provide patient's identification data and other data in accordance with local laws. If the data are recognized as valid, the data access rights manager 130a defines read access rights and asks the user data processor 102 of the device 520a for the patient's public key. In the next step, the rights manager transfer the patient's identifier and his public key to the modifier 140a. The modifier 140a contact the storage device 150a and make a modification to the container, where:
- the public key for access to the history is decrypted (PublItem'→PublItem) with the Service's private key (PrivService) in the access structure for the Service;
- the public key is copied;
- an access structure for the patient is created, and the public key PublItem is placed in it; and
- the public key for access to the history is encrypted (PublItem→PublItem') with the patient's public key Pub/Patient received from the patient device means 520a.

The container now contains two structures for access to the medical history data:

Container = {ID_Container:[IDPatient],
UAI_Patient:[PublItem'],
UAI_Service:[PrivItem', PublItem'],
Item:[MedicalData']
}, where:

UAI_Service is the access structure for the Service with the encrypted public key for access to the element (PublItem') and the encrypted private key for access to the element (PrivItem'), these keys having been encrypted with the Service's public key PublService; UAI_Patient is the access structure for the patient with the encrypted public key for access to the element (PublItem').

The patient receives access to his medical history via the user data processor 102 of the device 520a. The user data processor 120 contacts the storage device 150a and receives access to the container. The public key PublItem in the patient's access structure is decrypted with the patient's private key PrivPatient. The relevant fields of the medical history are decrypted with the public key PublItem. In a particular case, the user data processor copies the container from the storage device 150a and stores it locally, using the storage device 150b.

Let us consider an example in which the health clinic receives access to a medical history. In a particular case, when rights for a health clinic are requested from the user data processor 102 on a patient's device 520a, a notification is sent, and, on confirmation by the user data processor 102 in the patient's device 520a, the rights are sent to the clinic. In another particular case, the user data processor 102 in the patient's device 520a may itself initiate the definition of the rights, having sent an application to the data access rights manager 130a of the Service with a request. Let us consider a scenario in which the patient acts as the initiator of the granting of rights to the clinic. The system also includes a database of public keys of the health clinics 540a, in which the clinics' keys are placed after approval by the Service. The user data processor 102 sends a request from the patient's device 520a to the Service's data access rights manager 130a for the provision of rights of access to the patient's medical history to the user data processors that operate on behalf of the health clinic. The request contains at least the identification data of the clinic. The Service's data access rights manager 130a identify the patient and check for the presence of the health clinic's public keys in the database 540. If there is an entry with the health clinic's public key in the database, the Service's data access rights manager 130a defines the health clinic's rights of access to the medical history of the identified patient. The health clinic receives rights for reading and writing. In the next step, the Service's data access rights manager 130a transfer the patient's identifier and the clinic's public key to the modifier 140a.

The storage device 150a is contacted via the modifier 140a, and the patient's container (the container corresponding to the patient identifier) is modified, where:
- the Service's private key PrivService is used to decrypt the field of the Service's access structure containing the public key for access to the medical history: PublItem'→PublItem;
- the public key PublItem is copied;
- the Service's public key PublService is used to encrypt the field of the Service's access structure containing the public key for access to the medical history: PublItem→PublItem';
- the Service's private key PrivService is used to decrypt the field of the Service's access structure containing the private key for access to the medical history: PrivItem'→PrivItem;
- the private key PrivItem is copied;
- the Service's public key PublService is used to encrypt the field of the Service's access structure containing the private key for access to the medical history: PrivItem→PrivItem';
- an access structure for the health clinic is created, and the public key PublItem and the private key PrivItem are placed in it;
- the clinic's public key Pub/Clinic is used to encrypt the field of the structure containing the public key: PublItem→PubItem'; and
- the clinic's public key PublClinic is used to encrypt the field of the structure containing the private key PrivItem.

The container now contains three structures for access to the medical history data:

Container = {ID_Container:[IDPatient],
UAI_Clinic:[PrivItem', PublItem'],
UAI_Patient:[PublItem'],
UAI_Service:[PrivItem', PublItem'],
Item:[MedicalData']
}, where:

UAI_Service is the access structure for the Service with the encrypted public key for access to the element (PublItem') and the encrypted private key for access to the element (PrivItem'), these keys having been encrypted with the Service's public key PublService; UAI_Patient is the access structure for the patient with the encrypted public key for access to the element (PublItem'); and
UAI_Clinic is the access structure for the health clinic with the encrypted public key for access to the element (PublItem') and the encrypted private key for access to the element (PrivItem'), these keys having been encrypted with the clinic's public key PublClinic.

The health clinic receives read access to the patient's medical history via the user data processor 102 of the device 530a. The user data processor 102 of the device 530a contacts the storage device 150a and receives access to the container. The clinic's private key PrivClinic is used to decrypt the public key PublItem in the clinic's access structure. The public key PublItem is used to decrypt the relevant fields of the medical history. In a particular case, the user data processor 102 copy the container from the storage device 150*a* and store it locally, using the storage device 150*b*.

The health clinic receives write access to the patient's medical history via the user data processor 102 of the device 530*a*. The storage device 150*a* is contacted via the user data processor 102 and access is received to the container. The clinic's private key PrivClinic is used to decrypt the private key PrivIItem and the public key PublItem in the clinic's access structure. The public key PublItem is used to decrypt the relevant fields of the medical history. Data are added to the medical history. The private key PrivItem is used to encrypt said data. New data elements are written to the history in the same way.

Figure 10:
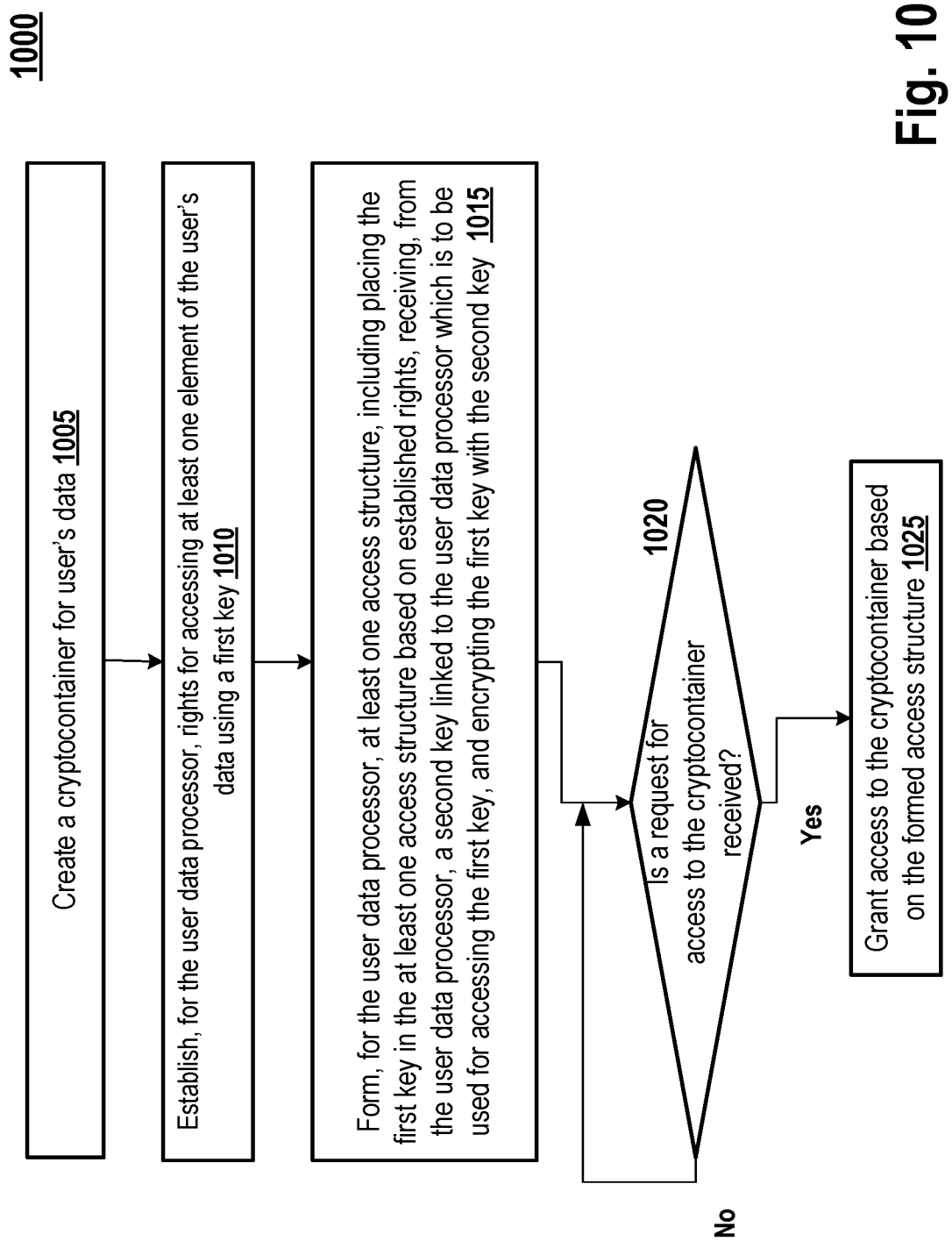
FIG. 10 illustrates a method for granting a user data processor access to a cryptocontainer of user data.

FIG. 10 illustrates a method 1000 for granting a user data processor access to a cryptocontainer of user data.

In step 1005, method 1000 creates a cryptocontainer for user's data, wherein the cryptocontainer receives at least one element of the user's data and encrypts the at least one element.

In step 1010, method 1000 establishes, for the user data processor, rights for accessing the at least one element of the user's data using a first key.

In step 1015, method 1000 forms, for the user data processor, at least one access structure, wherein the forming of the at least one access structure includes: placing the first key in the at least one access structure based on the established rights, receiving, from the user data processor, a second key linked to the user data processor which is to be used for accessing the first key, and encrypting the first key with the second key.

In step 1020, method 1000 determines whether or not a a request for access to the cryptocontainer is received. When the request is received, the method proceeds to step 1025. Otherwise the method remains in step 1020 and continues to monitor for requests.

In step 1025, when a request for access to the cryptocontainer is received, the method 1000 grants, to the user data processor, access to the cryptocontainer based on the formed at least one access structure. The method then proceeds to steps 1020 and 1005, as needed.

In one aspect, the cryptocontainer encrypts the at least one element using the first key.

In one aspect, the second key is a combination of at least a pair of keys comprising at least one private key and at least one public key.

In one aspect, the at least one public key is received for encrypting the first key.

In one aspect, information about the second key is transferred to the user data processor.

In one aspect, the at least one public key is received from the user data processor to which access is granted.

In one aspect, each element of the at least one element of the user's data is encrypting using a respective separate first key.

In one aspect, the rights for accessing the at least one element are established based on a set of actions that the user data processor is permitted to perform on the at least one element of the user data.

In one aspect, the set of actions includes at least one of: reading data, and writing data.

In one aspect, a separate first key is created for each action of the set of actions.

In one aspect, the created first key comprises a combination of at least a pair of keys, the pair of keys including at least one private first key and at least one public first key.

In one aspect, the pair of keys is formed from the private first key and the public first key such that the private first key is used for encrypting data when writing takes place and the public first key is used for decrypting the data when reading takes place.

In one aspect, the first public key is placed in the at least one access structure when rights for reading data from a field are established.

In one aspect, the first private key is placed in the at least one access structure when rights for writing data into a field are established.

In one aspect, the method further comprises: during the creation of the cryptocontainer for user's data, adding an access structure for a data access rights manager, wherein at least one first key for the added access structure of the data access rights manager is placed in the access structure of the user data processor, and wherein the at least one first key is encrypted.

In one aspect, the placing, in the access structure of the user data processor, the at least one first key for the added access structure of the data access rights manager includes extracting the first key from the access structure of the data access rights manager.

In one aspect, the method further comprises: requesting, on behalf of the user data processor, rights for accessing elements of the user's data in the created cryptocontainer.

FIG. 11 is a block diagram illustrating a computer system 20 on which aspects of systems and methods for granting a user data processor access to a cryptocontainer of user data may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 11, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for granting a user data processor access to a cryptocontainer of user data, the method comprising:
   creating a cryptocontainer for user data, wherein the cryptocontainer receives at least two elements of the user data and encrypts the at least two elements;
   establishing, for the user data processor, rights for accessing each of the at least two elements of the user data using a plurality of first keys for separately encrypting each of the at least two elements of user data;
   forming, for the user data processor, at least one access structure, wherein the forming of the at least one access structure includes:
      placing each first key of the plurality of first keys in the at least one access structure based on the established rights for accessing each of the at least two elements of the user data; and
      receiving, from the user data processor, a second key linked to the user data processor which is to be used for accessing the plurality of first keys, wherein the second key is a combination of at least a pair of keys comprising at least one private key and at least one public key, wherein each first key of the plurality of first keys is encrypted using the at least one public key of the second key, and wherein the elements of the user data are encrypted using the private key of the second key;
   during the creation of the cryptocontainer for user data, adding an access structure for a data access rights manager, wherein at least one first key for the added access structure of the data access rights manager is placed in the at least one access structure of the user data processor, wherein the at least one first key is encrypted; and
   when a request for access to the cryptocontainer is received from the user data processor, granting access to the cryptocontainer based on the at least one access structure formed for the user data processor.

2. The method of claim 1, wherein the cryptocontainer encrypts the at least two elements using the first key.

3. The method of claim 1, wherein information about the second key is transferred to the user data processor.

4. The method of claim 1, wherein the at least one public key is received from the user data processor to which access is granted.

5. The method of claim 1, wherein the rights for accessing the at least two elements are established based on a set of actions that the user data processor is permitted to perform on the at least two elements of the user data.

6. The method of claim 5, wherein the set of actions includes at least one of: reading data, and writing data.

7. The method of claim 6, wherein a separate first key is created for each action of the set of actions.

8. The method of claim 7, wherein the created first key comprises a combination of at least a pair of keys, the pair of keys including at least one private first key and at least one public first key.

9. The method of claim 8, wherein the pair of keys is formed from the private first key and the public first key such that the private first key is used for encrypting data when writing takes place and the public first key is used for decrypting the data when reading takes place.

10. The method of claim 9, wherein the public first key is placed in the at least one access structure when rights for reading data from a field are established.

11. The method of claim 9, wherein the private first key is placed in the at least one access structure when rights for writing data into a field are established.

12. The method of claim 1, wherein the placing, in the access structure of the user data processor, the at least one first key for the added access structure of the data access rights manager includes extracting the first key from the access structure of the data access rights manager.

13. The method of claim 1, further comprising:
   requesting, on behalf of the user data processor, rights for accessing elements of the user data in the created cryptocontainer.

14. A system for granting a user data processor access to a cryptocontainer of user data, comprising:
   at least one processor configured to:
      create a cryptocontainer for user data, wherein the cryptocontainer receives at least two elements of the user data and encrypts the at least two elements;
      establish, for the user data processor, rights for accessing each of the at least two elements of the user data using a plurality of first keys for separately encrypting each of the at least two elements of user data;
      form, for the user data processor, at least one access structure, wherein the forming of the at least one access structure includes:
         placing each first key of the plurality of first keys in the at least one access structure based on the established rights for accessing each of the at least two elements of the user data; and
         receiving, from the user data processor, a second key linked to the user data processor which is to be used for accessing the plurality of first keys, wherein the second key is a combination of at least a pair of keys comprising at least one private key and at least one public key, wherein each first key of the plurality of first keys is encrypted using the at least one public key of the second key, and wherein the elements of the user data are encrypted using the private key of the second key;

during the creation of the cryptocontainer for user data, adding an access structure for a data access rights manager, wherein at least one first key for the added access structure of the data access rights manager is placed in the at least one access structure of the user data processor, wherein the at least one first key is encrypted; and when a request for access to the cryptocontainer is received from the user data processor, grant access to the cryptocontainer based on the at least one access structure formed for the user data processor.

15. The system of claim 14, wherein the cryptocontainer encrypts the at least two elements using the first key.

16. A non-transitory computer readable medium storing thereon computer executable instructions for granting a user data processor access to a cryptocontainer of user data, including instructions for:

creating a cryptocontainer for user data, wherein the cryptocontainer receives at least two elements of the user data and encrypts the at least two elements;

establishing, for the user data processor, rights for accessing each of the at least one element of the user data using a plurality of first keys for separately encrypting each of the at least two elements of user data;

forming, for the user data processor, at least one access structure, wherein the forming of the at least one access structure includes:

placing each first key of the plurality of first keys in the at least one access structure based on the established rights for accessing each of the at least two elements of the user data; and receiving, from the user data processor, a second key linked to the user data processor which is to be used for accessing the plurality of first keys, wherein the second key is a combination of at least a pair of keys comprising at least one private key and at least one public key, wherein each first key of the plurality of first keys is encrypted using the at least one public key of the second key, and wherein the elements of the user data are encrypted using the private key of the second key;

during the creation of the cryptocontainer for user data, adding an access structure for a data access rights manager, wherein at least one first key for the added access structure of the data access rights manager is placed in the at least one access structure of the user data processor, wherein the at least one first key is encrypted; and when a request for access to the cryptocontainer is received from the user data processor, granting access to the cryptocontainer based on the at least one access structure formed for the user data processor.

17. The system of claim 14, wherein the rights for accessing the at least two elements are established based on a set of actions that the user data processor is permitted to perform on the at least two elements of the user data.

18. The system of claim 17, wherein the set of actions includes at least one of: reading data, and writing data.

19. The system of claim 18, wherein a separate first key is created for each action of the set of actions.

* * * * *